(12) United States Patent
Saito et al.

(10) Patent No.: US 12,743,003 B2
(45) Date of Patent: Sep. 22, 2026

(54) FINDER AND IMAGING APPARATUS

(71) Applicant: FUJIFILM Corporation, Tokyo (JP)

(72) Inventors: Hiroki Saito, Saitama (JP); Shunsuke Miyagishima, Saitama (JP); Kosuke Takahashi, Saitama (JP); Tomoki Otsuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 355 days.

(21) Appl. No.: 18/465,331

(22) Filed: Sep. 12, 2023

(65) Prior Publication Data

US 2024/0045310 A1 Feb. 8, 2024

Related U.S. Application Data

(63) Continuation of application No. PCT/JP2022/004895, filed on Feb. 8, 2022.

(30) Foreign Application Priority Data

Mar. 18, 2021 (JP) ................................ 2021-044876

(51) Int. Cl.
*G03B 13/16* (2021.01)
*G02B 15/14* (2006.01)
(Continued)

(52) U.S. Cl.
CPC ...... *G03B 13/16* (2013.01); *G02B 15/144113* (2019.08); *G02B 15/15* (2013.01);
(Continued)

(58) Field of Classification Search
CPC ........ G03B 13/16; G03B 13/06; G03B 13/08; G03B 17/20; G02B 15/144113;
(Continued)

(56) References Cited

U.S. PATENT DOCUMENTS 6,018,416 A 1/2000 Mihara
6,233,097 B1 5/2001 Mihara
(Continued)

FOREIGN PATENT DOCUMENTS

JP H04-086733 A 3/1992
JP H11-133298 A 5/1999
(Continued)

OTHER PUBLICATIONS

Ito, Espacenet Translation of WO2020045559A1, Espacenet (Year: 2020).*

(Continued)

*Primary Examiner* — Bumsuk Won
*Assistant Examiner* — Ray Alexander Dean
(74) *Attorney, Agent, or Firm* — Studebaker Brackett PLLC

(57) ABSTRACT

A finder includes, in order from an object side to an eye point side, an objective optical system that forms an intermediate image, and an ocular optical system that is provided for observation of the intermediate image. The intermediate image is positioned on the optical path between the objective optical system and the ocular optical system. The finder includes a plurality of reflecting surfaces for forming an erect image, and each of the objective optical system and the ocular optical system has at least one of the plurality of reflecting surfaces. The finder satisfies a conditional expression: 2<fo/fe<8 regarding a focal length fo of the objective optical system and a focal length fe of the ocular optical system.

22 Claims, 18 Drawing Sheets

(51) Int. Cl.
*G02B 15/15* (2006.01)
*G02B 17/08* (2006.01)
*H04N 23/69* (2023.01)

(52) U.S. Cl.
CPC ..... *G02B 17/0888* (2013.01); *G02B 17/0896* (2013.01); *H04N 23/69* (2023.01)

(58) Field of Classification Search
CPC ................ G02B 15/15; G02B 17/0888; G02B 17/0896; G02B 5/04; G02B 13/18; G02B 15/16; G02B 15/167; G02B 15/20; G02B 25/00; H04N 23/69
See application file for complete search history.

(56) References Cited

U.S. PATENT DOCUMENTS

| | | | | |
|---|---|---|---|---|
| 2005/0259157 | A1* | 11/2005 | Keiichi | G03B 13/14 348/208.99 |
| 2006/0153553 | A1 | 7/2006 | Tochigi et al. | |
| 2009/0220224 | A1 | 9/2009 | Tochigi et al. | |
| 2018/0017775 | A1* | 1/2018 | Hirose | G02B 21/0012 |

FOREIGN PATENT DOCUMENTS

| | | | | |
|---|---|---|---|---|
| JP | 2005-352240 | A | 12/2005 | |
| JP | 2006-259476 | A | 9/2006 | |
| JP | 2007-256644 | A | 10/2007 | |
| JP | 2009-186675 | A | 8/2009 | |
| JP | 2012-088604 | A | 5/2012 | |
| JP | 2012-133110 | A | 7/2012 | |
| JP | 2018-010215 | A | 1/2018 | |
| WO | WO-2020045559 | A1 * | 3/2020 | G02B 15/167 |

OTHER PUBLICATIONS

International Search Report issued in PCT/JP2022/004895; mailed Apr. 26, 2022.

International Preliminary Report on Patentability (Chapter I) and Written Opinion of the International Searching Authority issued in PCT/JP2022/004895; issued Sep. 12, 2023.

An Office Action; "Notice of Reasons for Refusal," mailed by the Japanese Patent Office on Mar. 5, 2024, which corresponds to Japanese Patent Application No. 2023-506863 and is related to U.S. Appl. No. 18/465,331; with English language translation.

* cited by examiner

EXAMPLE 1
EP
CG
L23
L22
L21
P2
2
3
4
MI
L8
P1
1
G4
L7
L6
G3
L5
G2
L4
L3
G1
L2
L1
Ax
Kb
Ka

EXAMPLE 1
WIDE ANGLE END
φ = 8.0
ω = 16.30°
d LINE
C LINE
F LINE
d LINE (S)
d LINE (T)
-2 0 2
-20 -10 0 10 20
SPHERICAL ABERRATION [dpt]
ASTIGMATISM [dpt]
DISTORTION [%]
LATERAL CHROMATIC ABERRATION [min]
TELEPHOTO END
ω = 5.18°

EXAMPLE 4
EP
CG
L23
L22
L21
2
P2
MI
3
4
L9
P1
1
G4
L8
L7
G3
L6
G2
L5
L4
L3
G1
L2
L1
Ax
Kb
Ka

FINDER AND IMAGING APPARATUS

CROSS-REFERENCE TO RELATED APPLICATIONS

This application is a continuation application of International Application No. PCT/JP2022/004895, filed on Feb. 8, 2022, which claims priority from Japanese Patent Application No. 2021-044876, filed on Mar. 18, 2021. The entire disclosure of each of the above applications is incorporated herein by reference.

BACKGROUND

Technical Field

The present disclosure relates to a finder and an imaging apparatus.

Related Art

Hitherto, a lens system described in JP2012-133110A and JP2012-88604A is known as an optical system that can be used in a finder.

An object of a technique of the present disclosure is to provide a finder having a higher optical finder magnification while suppressing an increase in size of an optical system, and an imaging apparatus comprising the finder.

SUMMARY

A finder according to an aspect of the technique of the present disclosure comprises an objective optical system that includes, in order from an object side to an eye point side along an optical path, includes at least one lens and forms an intermediate image, and an ocular optical system that includes at least one lens and is provided for observation of the intermediate image, in which the intermediate image is positioned on the optical path between the objective optical system and the ocular optical system, the finder includes a plurality of reflecting surfaces for forming an erect image, each of the objective optical system and the ocular optical system has at least one of the plurality of reflecting surfaces, and assuming that a focal length of the objective optical system in a state in which an infinite distance object is observed is fo, in a case where the objective optical system is a variable magnification optical system, fo is a value at a telephoto end, and a focal length of the ocular optical system in a state in which diopter is −1 is fe, Conditional Expression (1) is satisfied, which is represented by $$2<fo/fe<8 \quad (1).$$

In the finder of the aspect, it is preferable that, assuming that a distance from a most object-side lens surface of the objective optical system to the intermediate image on an optical axis in a state in which the infinite distance object is observed is do, in a case where the objective optical system is the variable magnification optical system, do is a value at the telephoto end, and a distance from the intermediate image to a most eye point-side lens surface of the ocular optical system on the optical axis in a state in which the infinite distance object is observed and the diopter is −1 is de, Conditional Expression (2) is satisfied, which is represented by $$1.8<do/de<6 \quad (2).$$

It is preferable that the objective optical system has a first prism including the reflecting surface, the ocular optical system has a second prism including the reflecting surface, and assuming that a distance from a most object-side surface of the first prism to a most eye point-side surface of the first prism on an optical axis is dPo, and a distance from a most object-side surface of the second prism to a most eye point-side surface of the second prism on the optical axis is dPe, the finder of the aspect satisfies Conditional Expression (3) represented by $$1.1<dPo/dPe<5 \quad (3).$$

In the finder of the aspect, it is preferable that diopter adjustment is performed by moving at least one lens of the ocular optical system along an optical axis.

In the finder of the aspect, it is preferable that the diopter adjustment is performed by moving at least one lens of the objective optical system along the optical axis.

In the finder of the aspect, it is preferable that an optical surface having refractive power closest to the intermediate image on the object side of the intermediate image has positive refractive power. It is preferable that, assuming that a distance from the optical surface to the intermediate image on an optical axis is di, the finder of the aspect satisfies Conditional Expression (4), which is represented by $$0.025<di/fe<0.4 \quad (4).$$

It is preferable that, assuming that a refractive index of a medium on the object side of the optical surface with respect to a d line is Nda, and a radius of curvature of the optical surface is Ra, the finder of the aspect satisfies Conditional Expression (11) represented by $$-2.5<fe\times Nda/Ra<-0.4 \quad (11).$$

It is preferable that the finder of the aspect further comprises a display element that displays an image, at a position of the intermediate image or an optically conjugate position with the intermediate image, and assuming that, in a case where the display element is disposed at the position of the intermediate image, an air conversion distance between an image display surface of the display element and the intermediate image in an optical axis direction is d, and in a case where the display element is disposed at the conjugate position, an air conversion distance between the image display surface of the display element and the conjugate position in the optical axis direction is d, Conditional Expression (5) is satisfied, which is represented by $$0\leq|d|/fe<0.08 \quad (5).$$

In a case where the finder of the aspect comprises the display element, it is preferable that the finder of the aspect further comprises a light shielding member that shields at least a part of luminous flux emitted from the objective optical system, on the optical path between the objective optical system and the ocular optical system. Then, it is preferable that a region that is shielded by the light shielding member is variable.

In a case where the finder of the aspect performs diopter adjustment by moving at least one lens of the objective optical system along the optical axis, it is preferable that the finder of the aspect is a finder provided in an imaging apparatus, and it is preferable that the finder of the aspect comprises a display element that is disposed at a position of the intermediate image and displays an image, and a condensing position variable mechanism that changes a condensing position of light from the objective optical system by moving at least one lens to be moved during the diopter adjustment of the objective optical system. It is preferable that the condensing position variable mechanism moves the condensing position to a position different from the display element in an unused state of the imaging apparatus.

It is preferable that the objective optical system includes a plurality of lens groups in which an interval between adjacent groups changes during zooming. In this case, it is preferable that the objective optical system includes a negative lens group having negative refractive power that is moved to the eye point side during zooming from a wide angle end to the telephoto end, and a positive lens group having positive refractive power that is moved to the object side during zooming from the wide angle end to the telephoto end.

It is preferable that the negative lens group includes two or more negative lenses. It is preferable that, assuming that an Abbe's number of the negative lens of the negative lens group based on a d line is νdno, the negative lens group includes at least one negative lens satisfying Conditional Expression (6) represented by $$40<\nu dno<110 \quad (6).$$

It is preferable that, assuming that a difference between a position at the wide angle end and a position at the telephoto end of the negative lens group is dwtn, and a distance from a most object-side lens surface of the objective optical system at the telephoto end to the intermediate image on an optical axis in a state in which the infinite distance object is observed is do, the finder of the aspect satisfies Conditional Expression (12) represented by $$0.05<dwtn/do<0.5 \quad (12).$$

It is preferable that a most object-side lens group of the objective optical system has positive refractive power. It is preferable that, assuming that a focal length of the most object-side lens group of the objective optical system is fl, the finder of the aspect satisfies Conditional Expression (7) represented by $$0.45<fl/fo<3 \quad (7).$$

It is preferable that, assuming that a refractive index of a positive lens of a lens group having positive refractive power of the objective optical system with respect to the d line is Ndpo, the lens group having the positive refractive power of the objective optical system includes at least one positive lens satisfying Conditional Expression (8) represented by $$1.65<Ndpo<2.3 \quad (8).$$

It is preferable that the ocular optical system includes one or more positive lenses and one or more negative lenses. It is preferable that, assuming an Abbe's number of the negative lens of the ocular optical system based on a d line is νdne, the ocular optical system includes at least one negative lens satisfying Conditional Expression (9) represented by $$10<\nu dne<40 \quad (9).$$

It is preferable that, assuming that a focal length of the negative lens satisfying Conditional Expression (9) of the ocular optical system is fne, and a distance from the intermediate image to a most eye point-side lens surface of the ocular optical system on an optical axis in a state in which the infinite distance object is observed and the diopter is −1 is de, the ocular optical system includes at least one negative lens satisfying Conditional Expression (10) represented by $$-3<fne/de<-0.2 \quad (10).$$

An imaging apparatus according to another aspect of the technique of the present disclosure comprises the finder of the aspect.

In the specification, it should be noted that the terms "consisting of" and "consists of" mean that not only the above-described components but also lenses substantially having no refractive power, optical elements, such as a stop, a filter, and a cover glass, other than lenses, and a lens flange, a lens barrel, and the like may be included.

In the present specification, a sign of refractive power, a radius of curvature, and a surface shape regarding a lens including an aspherical surface are considered in terms of a paraxial region unless otherwise specified. A sign of a radius of curvature of a surface convex toward the object side is positive, and a sign of a radius of curvature of a surface convex toward the eye point side is negative.

The term "focal length" used in the conditional expressions means a paraxial focal length. The values used in the conditional expression are values that are obtained based on a d line. The "d line", "C line", and "F line" described in the present specification are bright lines, the wavelength of the d line is 587.56 nm (nanometers), the wavelength of the C line is 656.27 nm (nanometers), and the wavelength of the F line is 486.13 nm (nanometers).

DESCRIPTION OF EMBODIMENTS

Figure 1:
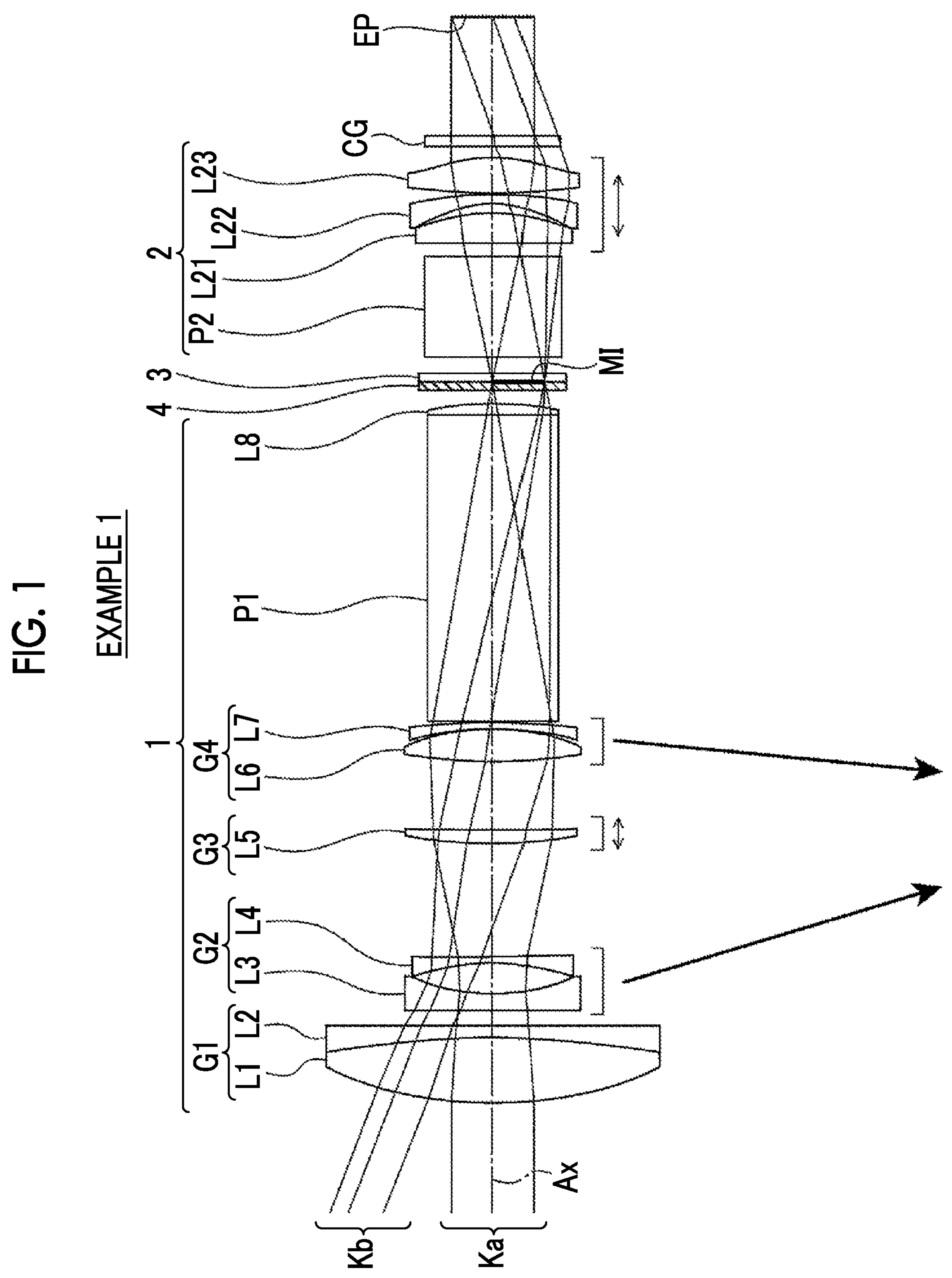
FIG. 1 is a cross-sectional view showing a configuration and luminous flux of a finder corresponding to a finder of Example 1 according to an embodiment in a case where an optical path of the finder is expanded.

Hereinafter, an example of an embodiment of the technique of the present disclosure will be described referring to the drawings.

Figure 2:
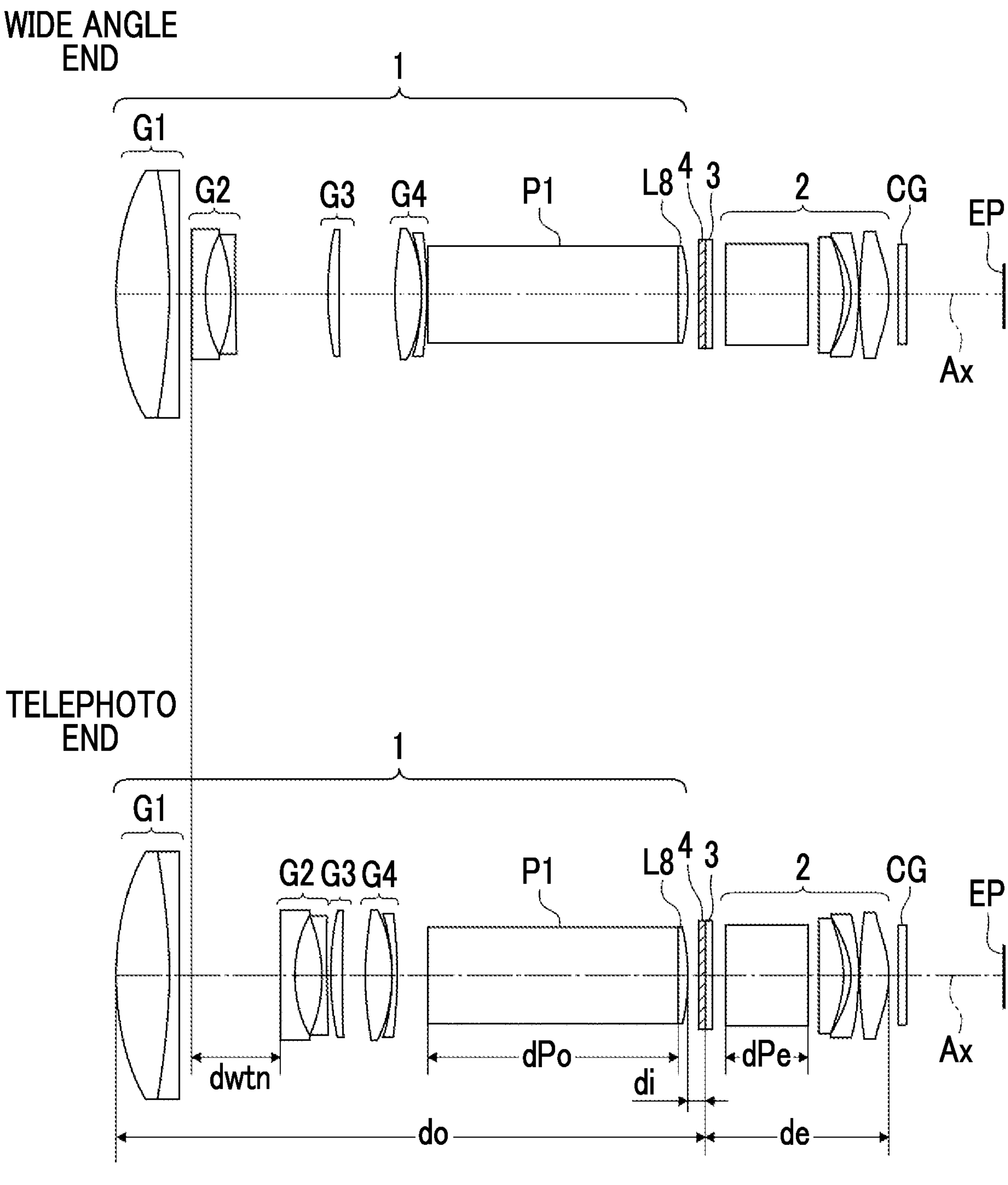
FIG. 2 is a cross-sectional view showing a configuration in each zoom state of the finder of FIG. 1.

FIG. 1 shows a configuration of an optical system of a finder and luminous flux according to an embodiment of the technique of the present disclosure. The finder according to the present embodiment is provided and used in, for example, an imaging apparatus, such as a digital camera. The configuration example shown in FIG. 1 corresponds to Example 1 described below. The optical system of FIG. 1 is a variable magnification optical system, and FIG. 2 shows a configuration in each zoom state of the finder of FIG. 1. In FIG. 2, an upper part labeled "wide angle end" indicates a wide angle end state, and a lower part labeled "telephoto end" indicates a telephoto end state. While an optical path of the finder of the present embodiment has a bent shape, FIGS. 1 and 2 are cross-sectional views in a case where the optical path is expanded. In FIGS. 1 and 2, the left side is an object side, and the left side is an eye point EP side. An eye point EP of FIGS. 1 and 2 does not indicate a shape, but indicates a position in a direction of an optical axis Ax.

The finder of the present embodiment is a real-image type finder comprising, in order from the object side to the eye point EP side along the optical path, an objective optical system 1 that forms an intermediate image MI, and an ocular optical system 2 that is provided for observation of the intermediate image MI. The intermediate image MI is positioned on the optical path between the objective optical system 1 and the ocular optical system 2. Each of the objective optical system 1 and the ocular optical system 2 includes at least one lens.

While an image that is formed only by the lenses of the objective optical system 1 is an inverted image, an image that is observed by a user is preferably an erect image. Accordingly, the finder of the present embodiment includes a plurality of reflecting surfaces for forming the erect image. The plurality of reflecting surfaces each have an action of inverting an image, and configures an image erecting optical system that is an optical system for forming an erect image as a whole. Each of the objective optical system 1 and the ocular optical system 2 in the present embodiment has at least one of the plurality of reflecting surfaces. That is, components of the image erecting optical system are separately disposed on both the objective optical system 1 side and the ocular optical system 2 side with the intermediate image MI interposed therebetween. With such a configuration, because it is possible to reduce a maximum diameter of luminous flux passing through the image erecting optical system, it is advantageous for a reduction in size of the optical system.

As an example, the objective optical system 1 and the ocular optical system 2 of FIG. 1 are configured as follows. The objective optical system 1 consists of, in order from the object side to the eye point EP side along the optical path, seven lenses of lenses L1 to L7, a first prism P1, and a lens L8. The ocular optical system 2 consists of, in order from the object side to the eye point EP side along the optical path, a second prism P2 and three lenses of lenses L21 to L23. The objective optical system 1 consists of optical elements from an optical surface having refractive power on a most object side of the finder to an optical surface closest to the intermediate image MI on the object side of the intermediate image MI. The ocular optical system 2 consists of optical elements from an optical surface closest to the intermediate image MI on the eye point EP side of the intermediate image MI to an optical surface having refractive power on a most eye point EP side of the finder. Each of the first prism P1 and the second prism P2 includes a reflecting surface to be a component of the image erecting optical system. In FIG. 1, as the luminous flux, on-axis luminous flux Ka and luminous flux Kb of a maximum angle of view are shown.

The finder of FIG. 1 comprises a display element 3 that is disposed at a position of the intermediate image MI. The display element 3 is an element having light transmittance, and displays an image. The finder of FIG. 1 is configured such that an optical image as the intermediate image MI formed by the objective optical system 1 and an image displayed on the display element 3 can be observed in a superimposed manner. That is, the finder of FIG. 1 is a hybrid type finder having both a function as an optical view finder (OVF) and a function as an electronic view finder (EVF).

The finder of FIG. 1 comprises a light shielding member 4 on the optical path between the objective optical system 1 and the ocular optical system 2. The light shielding member 4 shields at least a part of luminous flux emitted from the objective optical system 1. Accordingly, it is possible to improve the visibility of an image displayed on the display element 3. A region that is shielded by the light shielding member 4 is variable. The display element 3 and the light shielding member 4 will be described below in detail.

As an example, the finder of FIG. 1 comprises a parallel plate-shaped optical member CG between the ocular optical system 2 and the eye point EP. The optical member CG is a member that assumes a cover glass for protection, various filters, or the like. The optical member CG is a member having no refractive power. The finder may be configured while omitting the optical member CG.

Figure 3:
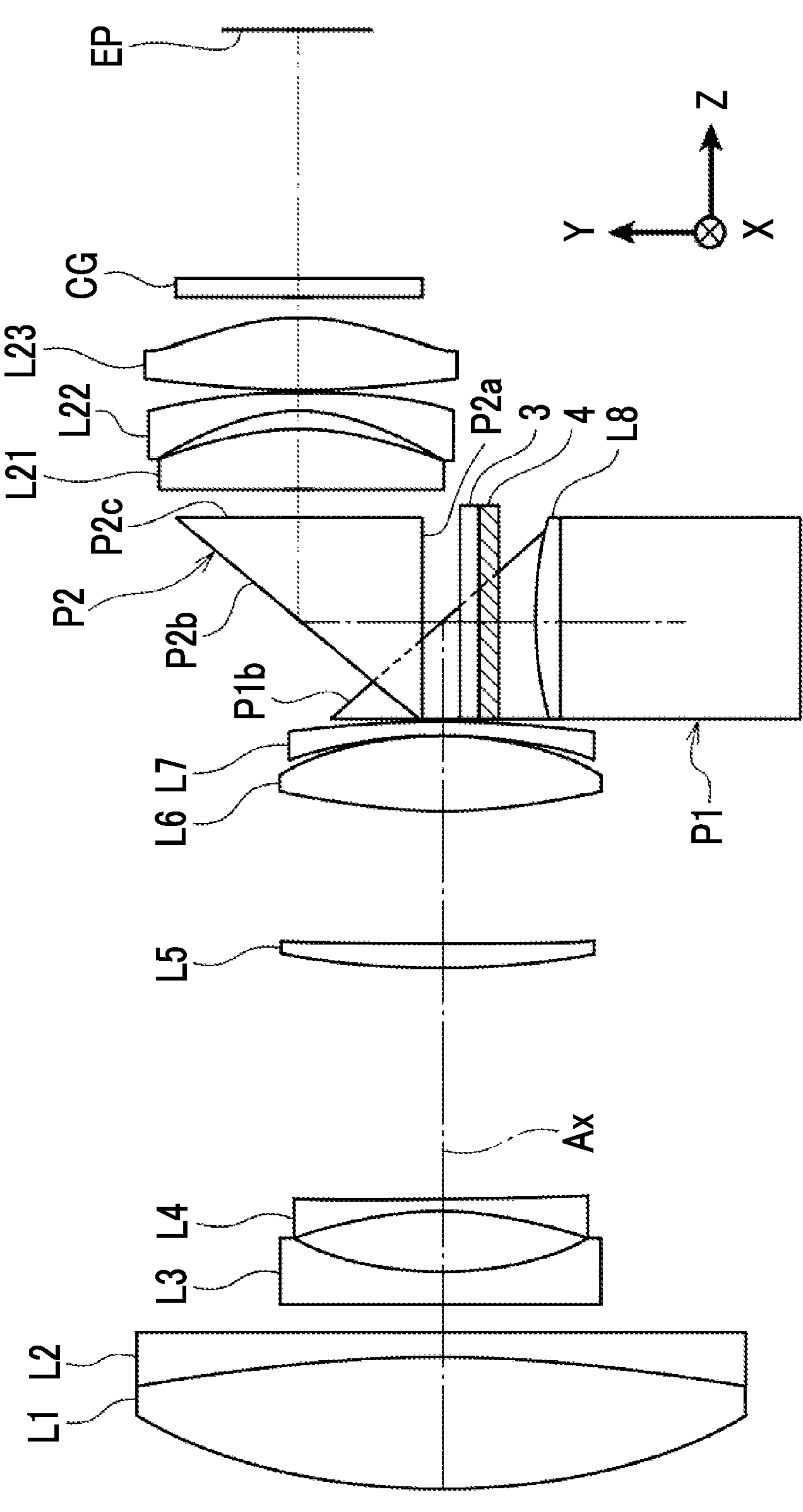
FIG. 3 is a side view of the finder of FIG. 1 in a case where the optical path is not expanded.
Figure 4:
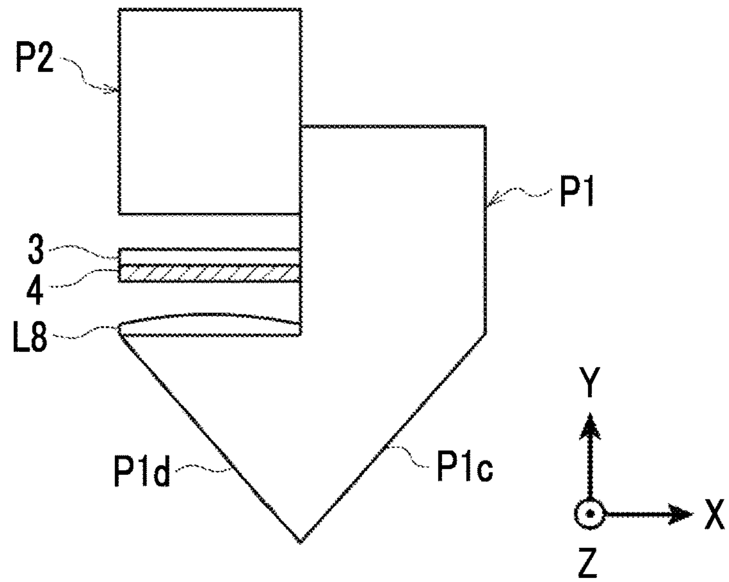
FIG. 4 is a front view of a portion of the finder of FIG. 1.
Figure 5:
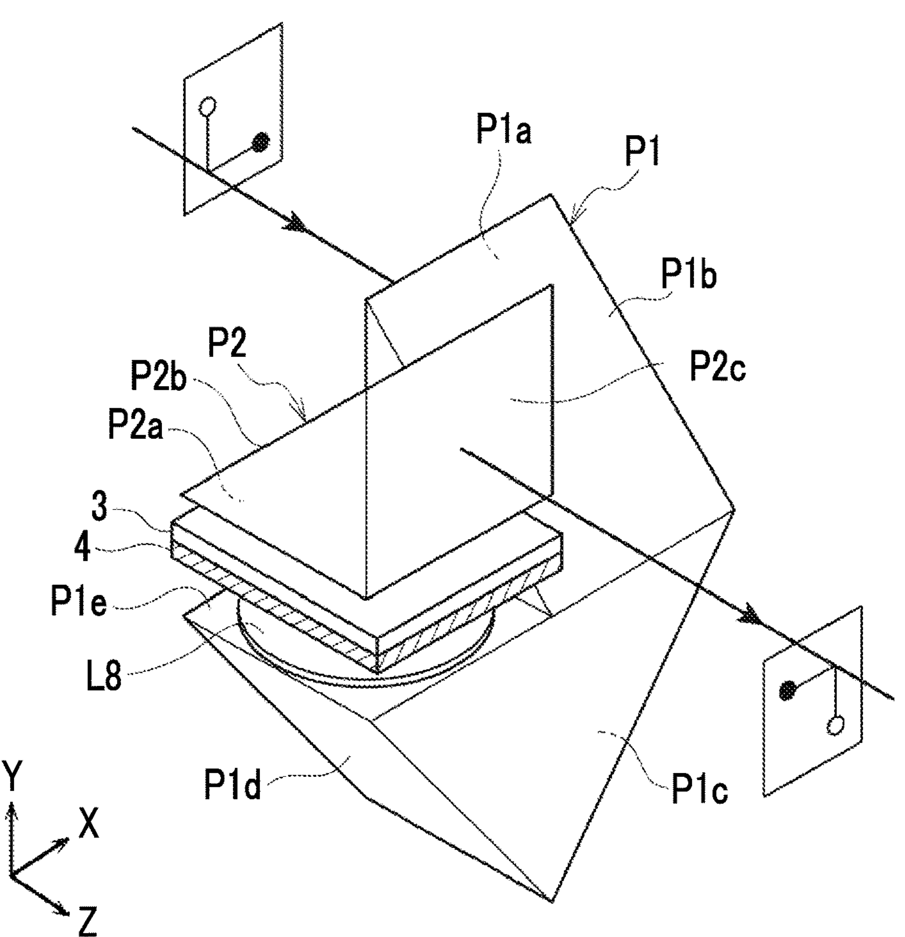
FIG. 5 is a perspective view of the portion of the finder of FIG. 1.

FIG. 3 is a side view in a case where the optical path of the finder of FIG. 1 is not expanded. The optical path is bent by the reflecting surfaces of the first prism P1 and the second prism P2. A front view of a portion from the first prism P1 to the second prism P2 is shown in FIG. 4, and a perspective view is shown in FIG. 5.

The image erecting optical system of the present embodiment will be described referring to FIGS. 3, 4, and 5. Hereinafter, description will be provided using the X axis, the Y axis, and the Z axis of the rectangular coordinate system. In the description, a direction from the object side toward the eye point EP side, which is the same direction of the optical axis Ax of the lenses L1 to L7, is referred to as a +Z-axis direction, an up direction of FIGS. 3 and 4 is referred to as a +Y-axis direction, and a right direction of FIG. 4 is referred to as a +X-axis direction.

The first prism P1 has an incident surface P1*a* perpendicular to the Z axis, a reflecting surface P1*b* inclined at 45 degrees with respect to an XY plane, a reflecting surface P1*c* inclined at 45 degrees with respect to a YZ plane, a reflecting surface P1*d* inclined at 45 degrees with respect to the YZ plane in a direction opposite to the reflecting surface P1*c*, and an emission surface P1*e* perpendicular to the Y axis. The second prism P2 has an incident surface P2*a* perpendicular to the Y axis, a reflecting surface P2*b* inclined at −45 degrees with respect to the XY plane, and an emission surface P2*c* perpendicular to the Z axis.

Light that travels in the +Z-axis direction from the object side and reaches the first prism P1 enters the first prism P1 from the incident surface P1*a* and goes straight, is reflected in a −Y-axis direction by the reflecting surface P1*b*, is reflected in a −X-axis direction by the reflecting surface P1*c*, is reflected in the +Y-axis direction by the reflecting surface P1*d*, and is emitted from the emission surface P1*e*. The emitted light travels in the +Y-axis direction, passes through the lens L8, the light shielding member 4, and the display element 3 in order, then, enters the second prism P2 from the incident surface P2*a* and goes straight, is reflected in the +Z-axis direction by the reflecting surface P2*b*, and is emitted from the emission surface P2*c*.

The reflecting surface P1*b*, the reflecting surface P1*c*, the reflecting surface P1*d*, and the reflecting surface P2*b* are the components of the image erecting optical system. By passing through the four reflecting surfaces, as schematically shown in FIG. 5, an image emitted from the emission surface P2*c* with respect to an object incident on the incident surface P1*a* is reversed horizontally and vertically. While an image that is formed only by the lenses of the objective optical system 1 is an inverted image, the finder comprises the image erecting optical system having the above-described configuration, so that the user can observe an erect image.

Assuming that a focal length of the objective optical system 1 is fo, and a focal length of the ocular optical system 2 is fe, the finder is configured to satisfy Conditional Expression (1) described below. Note that fo is a value in a state in which the infinite distance object is observed, and in a case where the objective optical system 1 is a variable magnification optical system, fo is a value at the telephoto end. Furthermore, fe is a value in a state in which diopter is −1. A corresponding value of Conditional Expression (1) is set to be not equal to or less than a lower limit, whereby it is possible to allow observation of an object with higher image magnification. The corresponding value of Conditional Expression (1) is set to be not equal to or greater than an upper limit, whereby it is advantageous for a reduction in size of the optical system. To obtain more favorable characteristics, the finder more preferably satisfies Conditional Expression (1-1) described below, and still more preferably satisfies Conditional Expression (1-2) described below.

$$2<fo/fe<8 \quad (1)$$

$$2.3<fo/fe<6 \quad (1\text{-}1)$$

$$2.7<fo/fe<4.2 \quad (1\text{-}2)$$

It is preferable that, assuming a distance from a most object-side lens surface of the objective optical system 1 to the intermediate image MI on the optical axis Ax is do, and a distance from the intermediate image MI to a most eye point EP-side lens surface of the ocular optical system 2 on the optical axis Ax is de, the finder satisfies Conditional Expression (2) described below. Note that do is a value in a state in which the infinite distance object is observed, and in a case where the objective optical system 1 is a variable magnification optical system, do is a value at the telephoto end. Furthermore, de is a value in a state in which the infinite distance object is observed and the diopter is −1. A corresponding value of Conditional Expression (2) is set to be not equal to or less than a lower limit, whereby it is possible to suppress spread of luminous flux passing through a most eye point EP-side surface of the image erecting optical system on the eye point EP side with respect to the intermediate image MI. Thus, it is advantageous for a reduction in size of the optical system on the eye point EP side with respect to the intermediate image MI. The corresponding value of Conditional Expression (2) is set to be not equal to or greater than an upper limit, whereby it is possible to suppress spread of luminous flux passing through a most object-side surface of the image erecting optical system on the object side with respect to the intermediate image MI. Thus, it is advantageous for a reduction in size of the optical system on the object side with respect to the intermediate image MI. To obtain more favorable characteristics, the finder more preferably satisfies Conditional Expression (2-1) described below, and still more preferably satisfies Conditional Expression (2-2) described below.

$$1.8<do/de<6 \quad (2)$$

$$2.4<do/de<5 \quad (2\text{-}1)$$

$$3<do/de<4.2 \quad (2\text{-}2)$$

It is preferable that, assuming that a distance from a most object-side surface of the first prism P1 to a most eye point EP-side surface of the first prism P1 on the optical axis Ax is dPo, and a distance from a most object-side surface of the second prism P2 to a most eye point EP-side surface of the second prism P2 on the optical axis Ax is dPe, the finder satisfies Conditional Expression (3) described below. A corresponding value of Conditional Expression (3) is set to be not equal to or less than a lower limit, whereby it is possible to suppress spread of luminous flux passing through a most eye point EP-side surface of the image erecting optical system on the eye point EP side with respect to the intermediate image MI. Thus, it is advantageous for a reduction in size of the optical system on the eye point EP side with respect to the intermediate image MI. The corresponding value of Conditional Expression (3) is set to be not equal to or greater than an upper limit, whereby it is possible to suppress spread of luminous flux passing through a most object-side surface of the image erecting optical system on the object side with respect to the intermediate image MI. Thus, it is advantageous for a reduction in size of the optical system on the object side with respect to the intermediate image MI. That is, Conditional Expression (3) is satisfied, whereby it is possible to suppress an increase in effective diameter of each of the most eye point EP-side surface of the image erecting optical system and the most object-side surface of the image erecting optical system with satisfactory balance. Thus, it is advantageous for a reduction in size. To obtain more favorable characteristics, the finder more preferably satisfies Conditional Expression (3-1) described below, and still more preferably satisfies Conditional Expression (3-2) described below.

$$1.1<dPo/dPe<5 \quad (3)$$

$$2<dPo/dPe<4.5 \quad (3\text{-}1)$$

$$2.8<dPo/dPe<3.8 \quad (3\text{-}2)$$

It is preferable that an optical surface having refractive power closest to the intermediate image MI on the object side of the intermediate image MI has positive refractive power. Hereinafter, for convenience of description, an optical surface having refractive power closest to the intermediate image MI on the object side of the intermediate image MI is referred to as a near optical surface. In a case where the near optical surface has positive refractive power, because luminous flux from the near optical surface toward the ocular optical system 2 can be given a convergence action, it is advantageous for a reduction in size of the ocular optical system 2. In the example of FIG. 1, the near optical surface is a lens surface of the lens L8 on the eye point EP side. Note that, in the technique of the present disclosure, the near optical surface is not limited to the lens surface. For example, the near optical surface may be a surface of a prism having refractive power.

It is preferable that, assuming that a distance from the near optical surface to the intermediate image MI on the optical axis Ax is di, and a focal length of the ocular optical system 2 is fe, the finder satisfies Conditional Expression (4) described below. Note that fe is a value in a state in which the diopter is −1. A corresponding value of Conditional Expression (4) is set to be not equal to or less than a lower limit, whereby a difference in diopter is generated between the near optical surface and an image plane of the intermediate image MI, and even in a case where dust is adhered to the near optical surface, it is possible to avoid reflection of dust into an optical image. The corresponding value of Conditional Expression (4) is set to be not equal to or greater than an upper limit, whereby it is advantageous for a reduction in size of the image erecting optical system. To obtain more favorable characteristics, the finder more preferably satisfies Conditional Expression (4-1) described below, and still more preferably satisfies Conditional Expression (4-2) described below.

$$0.025<di/fe<0.4 \quad (4)$$

$$0.05<di/fe<0.3 \quad (4\text{-}1)$$

$$0.085<di/fe<0.25 \quad (4\text{-}2)$$

It is preferable that, assuming that the focal length of the ocular optical system 2 is fe, a refractive index of a medium of the near optical surface on the object side with respect to the d line is Nda, and a radius of curvature of the near optical surface is Ra, the finder satisfies Conditional Expression (11) described below. Note that fe is a value in a state in which the diopter is −1. A sign of Ra of a surface convex toward the object side is positive, and a sign of Ra of a surface convex toward the eye point EP side is negative. A corresponding value of Conditional Expression (11) is set to be not equal to or less than a lower limit, whereby an angle of rays in a case where off-axial rays enter the ocular optical system 2 does not excessively have a convergence tendency. Thus, it is possible to secure a length of eye relief. The corresponding value of Conditional Expression (11) is set to be not equal to or greater than an upper limit, whereby it is possible to change the angle of rays in a case where off-axial rays enter the ocular optical system 2, to a convergence tendency. Thus, it is advantageous for a reduction in size of the ocular optical system 2. To obtain more favorable characteristics, the finder more preferably satisfies Conditional Expression (11-1) described below, and still more preferably satisfies Conditional Expression (11-2) described below.

$$-2.5<fe\times Nda/Ra<-0.4 \quad (11)$$

$$-1.8<fe\times Nda/Ra<-0.8 \quad (11\text{-}1)$$

$$-1.55<fe\times Nda/Ra<-1.22 \quad (11\text{-}2)$$

It is preferable that the objective optical system 1 is a variable magnification optical system. In more detail, it is preferable that the objective optical system 1 includes a plurality of lens groups in which an interval between adjacent groups changes during zooming and performs zooming by changing the interval between adjacent groups of the plurality of lens groups. The zooming can be enabled, whereby it is possible to form the intermediate image MI of an optical image corresponding to various visual fields.

The objective optical system 1 of FIG. 1 as an example includes, continuously in order from the most object side to the eye point EP side, a first lens group G1, a second lens group G2, a third lens group G3, and a fourth lens group G4. The first lens group G1 consists of two lenses of lenses L1 and L2. The second lens group G2 consists of two lenses of lenses L3 and L4. The third lens group G3 consists of one lens of a lens L5. The fourth lens group G4 consists of two lenses of lenses L6 and L7. During zooming from the wide angle end to the telephoto end, the second lens group G2 is moved to the eye point EP side along the optical axis Ax, the fourth lens group G4 is moved to the object side along the optical axis Ax, and the first lens group G1 and the third lens group G3 are fixed. In FIG. 1, schematic movement directions during zooming from the wide angle end to the telephoto end are indicated by solid arrows below the lens groups that are moved during zooming.

In a case where the objective optical system 1 includes a plurality of lens groups in which the interval between adjacent groups changes during zooming, it is preferable that the objective optical system 1 includes a negative lens group having negative refractive power that is moved to the eye point EP side during zooming from the wide angle end to the telephoto end, and a positive lens group having positive refractive power that is moved to the object side during zooming from the wide angle end to the telephoto end. In such a case, it is advantageous for obtaining a high zoom ratio, and it is also advantageous for correcting change in diopter accompanied with zooming.

It is preferable that the negative lens group of the objective optical system 1 includes two or more negative lenses. In such a case, it is advantageous for suppressing fluctuation of a spherical aberration during zooming while maintaining a high zoom ratio.

It is preferable that, assuming that an Abbe's number of the negative lens of the negative lens group of the objective optical system 1 based on the d line is νdno, the negative lens group includes at least one negative lens satisfying Conditional Expression (6) described below. A corresponding value of Conditional Expression (6) is set to be not equal to or less than a lower limit, it is easy to correct axial chromatic aberration. The corresponding to Conditional Expression (6) is set to be not equal to or greater than an upper limit, whereby it is possible to improve availability of materials. Thus, it is advantageous for a reduction of a manufacturing cost. To obtain more favorable characteristics, instead of Conditional Expression (6), Conditional Expression (6-1) described below is more preferably applied, and Conditional Expression (6-2) is still more preferably applied.

$$40<\nu dno<110 \quad (6)$$

$$65<\nu dno<97 \quad (6\text{-}1)$$

$$70<\nu dno<80 \quad (6\text{-}2)$$

It is preferable that, assuming that a difference between a position at the wide angle end and a position at the telephoto end of the negative lens group of the objective optical system 1 is dwtn, and a distance from the most object-side lens surface of the objective optical system 1 to the intermediate image MI on the optical axis Ax is do, the finder satisfies Conditional Expression (12) described below. Note that do is a value in a state in which the infinite distance object at the telephoto end is observed. A corresponding value of Conditional Expression (12) is set to be not equal to or less than a lower limit, whereby it becomes easy to realize an optical system with a higher zoom ratio. The corresponding value of Conditional Expression (12) is set to be not equal to or greater than an upper limit, whereby it is possible to suppress a movement amount of the negative lens group during zooming. Thus, it is advantageous for a reduction in size. To obtain more favorable characteristics, the finder more preferably satisfies Conditional Expression (12-1) described below, and still more preferably satisfies Conditional Expression (12-2) described below.

$$0.05<dwtn/do<0.5 \quad (12)$$

$$0.09<dwtn/do<0.35 \quad (12\text{-}1)$$

$$0.14<dwtn/do<0.185 \quad (12\text{-}2)$$

It is preferable that a most object-side lens group of the objective optical system 1 has positive refractive power. In such a case, it is advantageous particularly for correcting a spherical aberration at the telephoto end.

It is preferable that, assuming that a focal length of the most object-side lens group of the objective optical system 1 is fl, and a focal length of the objective optical system 1 at the telephoto end in a state in which the infinite distance object is observed is fo, the objective optical system 1 satisfies Conditional Expression (7) described below. A corresponding value of Conditional Expression (7) is set to be not equal to or less than a lower limit, whereby it is advantageous for suppressing a spherical aberration that occurs in the objective optical system 1. The corresponding value of Conditional Expression (7) is set to be not equal to or greater than an upper limit, whereby it is possible to make luminous flux suitably converge with the most object-side lens group of the objective optical system 1. Thus, it is advantageous for a reduction in size of the objective optical system 1. To obtain more favorable characteristics, the objective optical system 1 more preferably satisfies Conditional Expression (7-1), and still more preferably satisfies Conditional Expression (7-2).

$$0.45<fl/fo<3 \quad (7)$$

$$0.62<fl/fo<2 \quad (7\text{-}1)$$

$$0.84<fl/fo<1.1 \quad (7\text{-}2)$$

It is preferable that, assuming that a refractive index of a positive lens of a lens group having positive refractive power of the objective optical system 1 with respect to the d line is Ndpo, at least one lens group having positive refractive power of the objective optical system 1 includes at least one positive lens satisfying Conditional Expression (8) described below. A corresponding value of Conditional Expression (8) is set to be not equal to or less than a lower limit, it is advantageous for correction of field curvature. The corresponding value of Conditional Expression (8) is set to be not equal to or greater than an upper limit, whereby it is possible to improve availability of materials. Thus, it is advantageous for a reduction of a manufacturing cost. To obtain more favorable characteristics, instead of Conditional Expression (8), Conditional Expression (8-1) described below is more preferably applied, and Conditional Expression (8-2) described below is still more preferably applied.

$$1.65<Ndpo<2.3 \quad (8)$$

$$1.72<Ndpo<2.15 \quad (8\text{-}1)$$

$$1.84<Ndpo<2.05 \quad (8\text{-}2)$$

It is preferable that the ocular optical system 2 includes one or more positive lenses and one or more negative lenses. In such a case, it is advantageous for correction of a lateral chromatic aberration.

It is preferable that, assuming that an Abbe's number of the negative lens of the ocular optical system 2 based on the d line is νdne, the ocular optical system 2 includes at least one negative lens satisfying Conditional Expression (9) described below. A corresponding value of Conditional Expression (9) is set to be not equal to or less than a lower limit, whereby it is possible to improve availability of materials. Thus, it is advantageous for a reduction of a manufacturing cost. The corresponding value of Conditional Expression (9) is set to be not equal to or greater than an upper limit, whereby it is advantageous for correction of a chromatic aberration generated in the ocular optical system 2, in particular, a lateral chromatic aberration. With this, in a case where the display element 3 is disposed at the position of the intermediate image MI as shown in FIG. 1, it is possible to allow more favorable observation of an image displayed on an image display surface of the display element 3. To obtain more favorable characteristics, instead of Conditional Expression (9), Conditional Expression (9-1) described below is more preferably applied, and Conditional Expression (9-2) described below is still more preferably applied.

$$10<\nu dne<40 \quad (9)$$

$$15<\nu dne<29 \quad (9\text{-}1)$$

$$22<\nu dne<25 \quad (9\text{-}2)$$

It is preferable that, assuming that a focal length of the negative lens satisfying Conditional Expression (9) of the ocular optical system 2 is fne, and a distance from the intermediate image MI to the most eye point EP-side lens surface of the ocular optical system 2 on the optical axis Ax is de, the finder includes at least one negative lens satisfying Conditional Expression (10) described below. Note that de is a value in a state in which the infinite distance object is observed and the diopter is −1. A corresponding value of Conditional Expression (10) is set to be not equal to or less than a lower limit, whereby it is possible to widen an interval between a reflecting surface of the image erecting optical system on the eye point EP side with respect to the intermediate image MI and the most object-side lens surface of the ocular optical system 2. Thus, it is possible to suppress the occurrence of stray light. The corresponding value of Conditional Expression (10) is set to be not equal to or greater than the upper limit, it is advantageous for a reduction in size of the ocular optical system 2. To obtain more favorable characteristics, instead of Conditional Expression (10), Conditional Expression (10-1) described below is more preferably applied, and Conditional Expression (10-2) described below is still more preferably applied.

$$-3<fne/de<-0.2 \quad (10)$$

$$-2<fne/de<-0.4 \quad (10\text{-}1)$$

$$-1.82<fne/de<-0.6 \quad (10\text{-}2)$$

As shown in FIG. 1, it is preferable that the finder comprises the display element 3 that is disposed at the position of the intermediate image MI to display an image. The image displayed on the display element 3 is, for example, a marker (visual field frame) indicating an imaging range of an imaging element in the imaging apparatus, imaging information, and a captured image. The display element 3 is disposed at the position of the intermediate image MI, whereby it is possible to allow observation of the intermediate image MI and the image displayed on the display element 3 in a superimposed manner. The above-described expression "the finder comprises the display element 3 that is disposed at the position of the intermediate image MI to display an image" also includes a case where the finder comprises the display element 3 that is disposed at a position including an error allowable for practical use in the technical field to which the technique of the present disclosure belongs.

The position where the display element 3 is disposed may be an optically conjugate position with the intermediate image MI, instead of the position of the intermediate image MI. Also in a case where the finder comprises the display element 3 at the optically conjugate position with the intermediate image MI, it is possible to allow observation of the intermediate image MI and the image displayed on the display element 3 in a superimposed manner. The above-described expression "the finder comprises the display element 3 at the optically conjugate position with the intermediate image MI" also includes a case where the finder comprises the display element 3 at a position including an error allowable for practical use in the technical field to which the technique of the present disclosure belongs.

Figure 6:
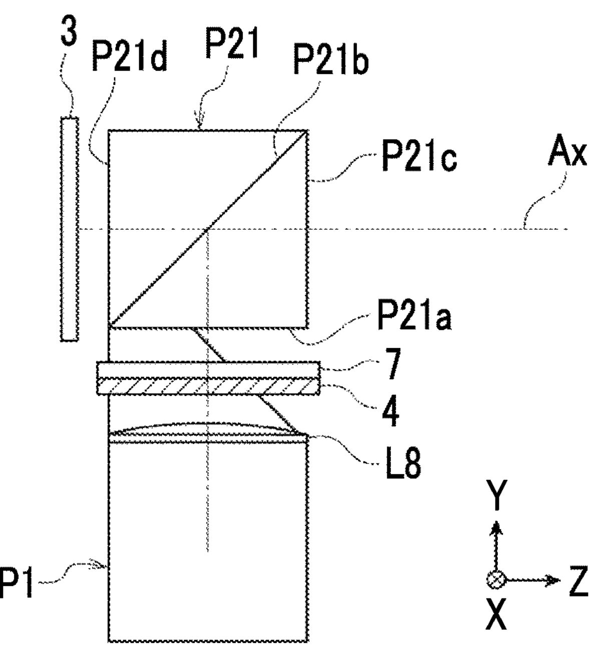
FIG. 6 is a side view of a main part of a modification example.
Figure 7:
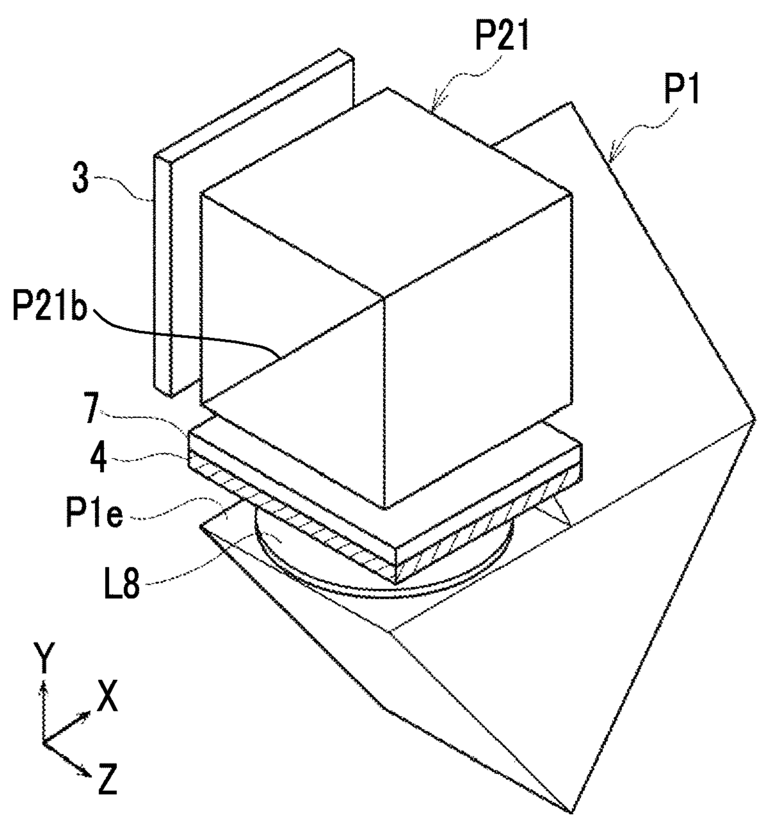
FIG. 7 is a perspective view of the main part of the modification example.

As an example, a side view of a main part of a configuration in which the finder comprises the display element 3 at the optically conjugate position with the intermediate image MI is shown in FIG. 6, and a perspective view is shown in FIG. 7. The configuration of FIGS. 6 and 7 is primarily different from the configuration of FIGS. 3 and 5 in that a half prism P21 is disposed instead of the second prism P2, the display element 3 is disposed at a position on the extension of the optical axis Ax of the ocular optical system 2 and an optically conjugate position with the intermediate image MI, and a parallel plate-shaped optical path length adjustment member 7 having light transmittance is disposed adjacent to the light shielding member 4. The optical path length adjustment member 7 is a member that adjusts an optical path length in a case where the configuration of FIG. 7 is used instead of the configuration of FIG. 5.

The half prism P21 has an incident surface P21*a* perpendicular to the Y axis, a reflecting and transmitting surface P21*b* inclined at 45 degrees with respect to the XY plane, an emission surface P21*c* perpendicular to the Z axis, and an incident surface P21*d* perpendicular to the Z axis. The reflecting and transmitting surface P21*b* is configured with a film formed inside the half prism P21, and has a function of branching incident light into reflected light and transmitted light. In the configuration of FIGS. 6 and 7, the reflecting and transmitting surface P21*b* functions as an element that combines light from the objective optical system 1 and light from the display element 3. The reflecting and transmitting surface P21*b* also functions as one reflecting surface of component of the image erecting optical system.

In a case where the configuration of FIGS. 6 and 7 is used, light that passes through the objective optical system 1, is emitted from the lens L8, and travels in the +Y-axis direction passes through the light shielding member 4, is transmitted through the optical path length adjustment member 7, then, enters the half prism P21 from the incident surface P21*a* and goes straight, and is reflected in the +Z-axis direction by the reflecting and transmitting surface P21*b*. On the other hand, light that travels in the +Z-axis direction from the display element 3 enters the half prism P21 from the incident surface P21*d*, is transmitted through the reflecting and transmitting surface P21*b*, and travels in the +Z-axis direction. Light from the objective optical system 1 and light from the display element 3 are combined in the reflecting and transmitting surface P21*b*, and combined light is emitted from the emission surface P21*c*. In such a manner, it is possible to allow observation of the intermediate image MI and the image displayed on the display element 3 in a superimposed manner.

It is preferable that, in a case where the display element 3 that displays an image is disposed at the position of the intermediate image MI or the optically conjugate position with the intermediate image MI, the finder satisfies Conditional Expression (5) described below. In regard to d of Conditional Expression (5), in a case where the display element 3 is disposed at the position of the intermediate image MI, an air conversion distance between the image display surface of the display element 3 and the intermediate image MI in a direction of the optical axis Ax is d. In regard to d of Conditional Expression (5), in a case where the display element 3 is disposed at the conjugate position, an air conversion distance between the image display surface of the display element 3 and the conjugate position in the direction of the optical axis Ax is d. A focal length of the ocular optical system 2 in a state in which the diopter is −1 is fe. In regard to a lower limit of Conditional Expression (5), because Id' is an absolute value, and fe is the focal length of the ocular optical system 2, a relationship of $0 \leq |d|/fe$ is obtained. A corresponding value of Conditional Expression (5) is set to be not equal to or greater than an upper limit, whereby it is possible to allow observation while suppressing a difference in diopter between the intermediate image MI and the image display surface. To obtain more favorable characteristics, the finder more preferably satisfies Conditional Expression (5-1) described below, and still more preferably satisfies Conditional Expression (5-2) described below.

$$0 \leq |d|/fe < 0.08 \quad (5)$$

$$0 \leq |d|/fe < 0.045 \quad (5\text{-}1)$$

$$0 \leq |d|/fe < 0.02 \quad (5\text{-}2)$$

It is preferable that the finder of the present embodiment is configured to adjust diopter. For this reason, it is preferable that the finder is configured to perform diopter adjustment by moving at least one lens of the ocular optical system 2 along the optical axis Ax. In such a case, it is advantageous for suppressing fluctuations of aberrations during diopter adjustment.

It is preferable that the finder is configured to perform diopter adjustment by moving at least one lens of the objective optical system 1 along the optical axis Ax. In such a case, it is possible to correct a difference in diopter between an object to be observed in the ocular optical system 2 and an image of an object to be observed in the objective optical system 1. Specifically, for example, it is possible to correct a difference in diopter between the image displayed on the display element 3 and the intermediate image MI formed by the objective optical system 1.

A group that is moved along the optical axis Ax to perform diopter adjustment is hereinafter referred to as a diopter adjustment group. In other words, the diopter adjustment group is a group that is moved during diopter adjustment. The diopter adjustment group may consist of only one lens, may consist of a plurality of lenses, or may consist of the whole of one lens group in which an interval between adjacent groups changes during zooming.

In the example of FIG. 1, the diopter adjustment group of the objective optical system 1 consists of one lens of the lens L5, and the diopter adjustment group of the ocular optical system 2 consists of three lenses of the lenses L21 to L23. In a case where diopter adjustment is performed in the ocular optical system 2, the lenses L21 to L23 are moved integrally. In the present specification, the expression "moved integrally" means that the lenses are moved simultaneously by the same amount in the same direction.

It is preferable that the finder is configured to move a condensing position of light from the objective optical system 1 to a position different from the display element 3 by moving the diopter adjustment group in an unused state of the imaging apparatus. In such a case, in a case where intense rays, such as sunlight, enters the finder in the unused state, it is possible to shift the condensing position from the display element 3 such that the display element 3 is not in focus. Thus, it is possible to prevent damage to the display element 3 due to condensing. Similarly, also to prevent damage to the light shielding member 4, it is preferable that a condensing position of light from the objective optical system 1 after the movement of the diopter adjustment group in the above-described unused state is a position different from the light shielding member 4. The movement of the diopter adjustment group in the above-described unused state is preferably performed automatically, but may be performed manually by the user.

Figure 8:
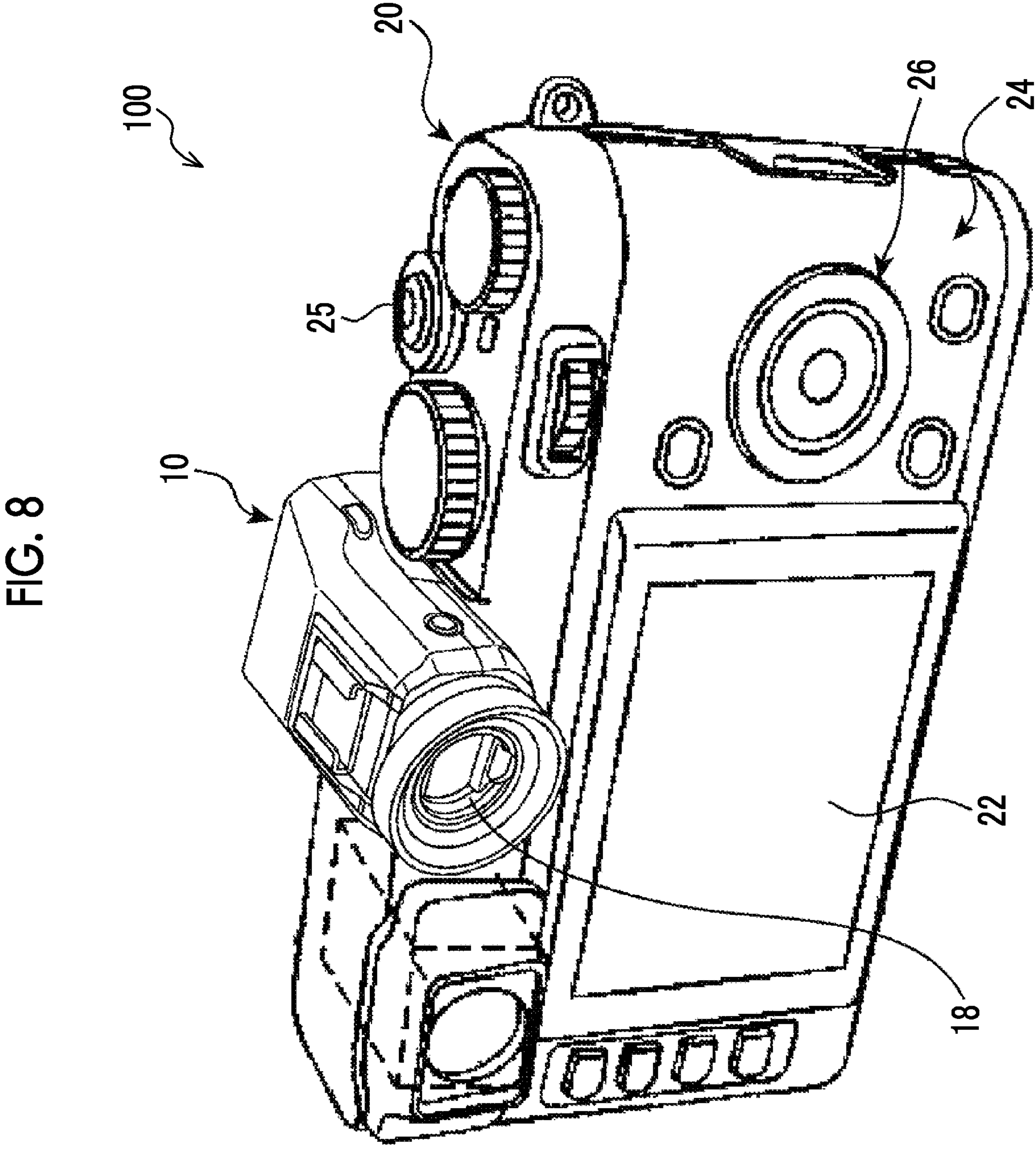
FIG. 8 is a perspective view of a rear side of an imaging apparatus according to the embodiment.
Figure 9:
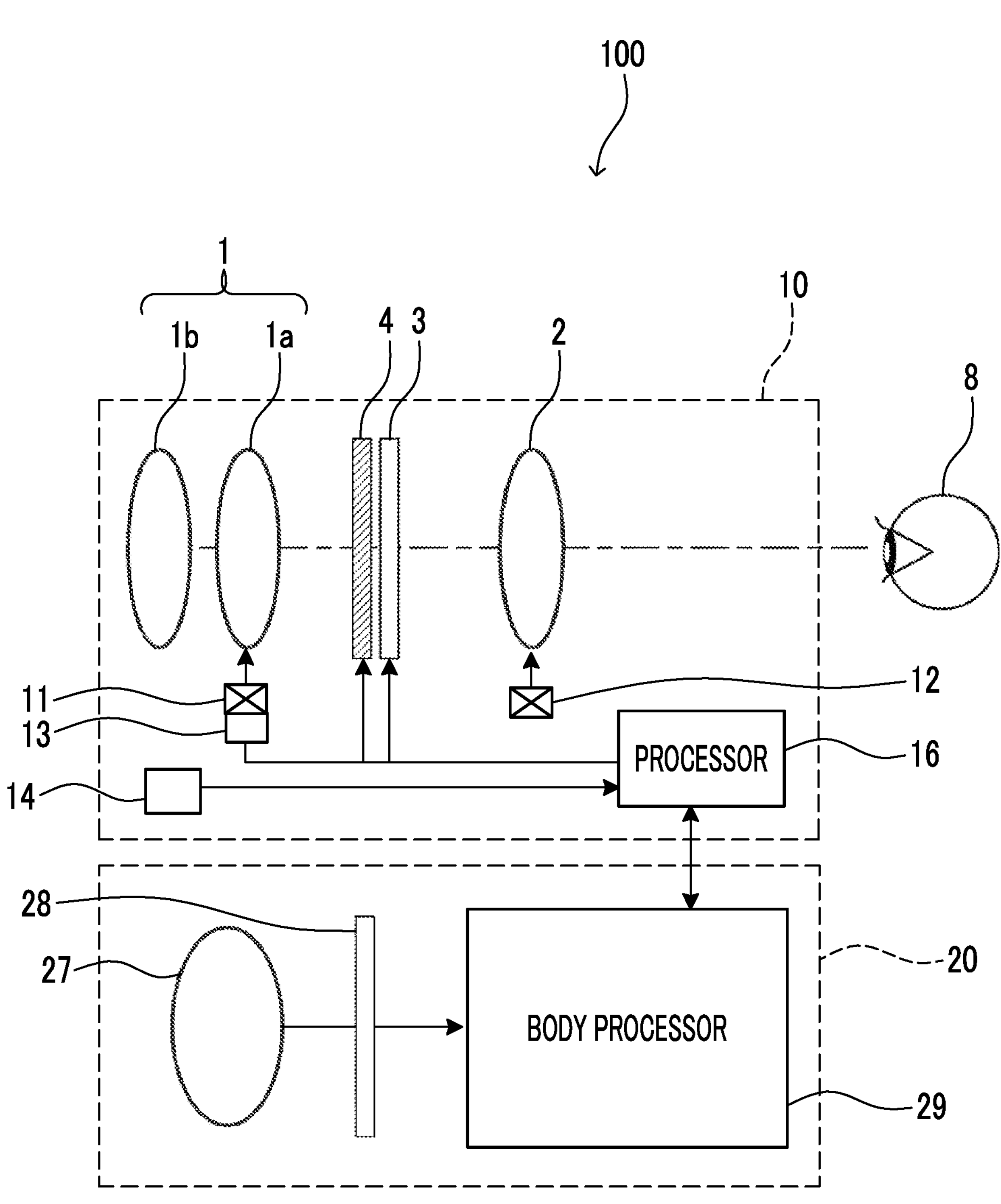
FIG. 9 is a functional configuration diagram of a main part of the imaging apparatus according to the embodiment.

Next, an imaging apparatus according to an embodiment of the technique of the present disclosure will be described referring to FIGS. 8 and 9. A camera 100 shown in FIGS. 8 and 9 is an example of the imaging apparatus according to the technique of the present disclosure. A perspective view of a rear surface side of the camera 100 is shown in FIG. 8, and a functional configuration diagram of a main part of the camera 100 is shown in FIG. 9. Hereinafter, an object that is an observation target to the finder and a target of imaging to the imaging apparatus is also referred to as a subject. Hereinafter, the intermediate image MI that is formed by the objective optical system 1 is also referred to as an optical image OP.

The camera 100 shown in FIG. 8 as an example comprises a camera body 20, and a finder 10 according to an embodiment of the technique of the present disclosure. The finder 10 shown in FIG. 8 is an external finder, and is attachably and detachably connected to an upper portion of the camera body 20 through a connecting part (not shown). The finder 10 is a look-in type finder that is used for a user 8 to set an angle of view or to confirm a subject during imaging. The finder 10 comprises an eyepiece window 18 through which the user 8 looks into the finder 10.

The camera body 20 shown in FIG. 8 comprises a rear display 22, an operation unit 24, and the like. The operation unit 24 is provided in an outer surface of the camera body 20 and receives an operation of the user 8. The operation unit 24 includes a release button 25, a cross key type or a control wheel type select button 26, a touch panel provided on the rear display 22, and the like. The release button 25 is depressed in a case where the user 8 gives an instruction to store a captured image. The select button 26 and the touch panel are operated, for example, in a case where the user 8 performs mode selection, condition setting, or the like.

As shown in FIG. 9, the finder 10 comprises an objective optical system 1, an ocular optical system 2, the display element 3, the light shielding member 4, an objective moving mechanism 11, an eyepiece moving mechanism 12, a sensor 13, an optical sensor 14, and a processor 16. In FIG. 8, the objective optical system 1 and the ocular optical system 2 are conceptually shown. For convenience of description, in FIG. 8, a diopter adjustment group 1*a* including the objective optical system 1 and another group 1*b* are separately shown.

The objective moving mechanism 11 and the eyepiece moving mechanism 12 are used during diopter adjustment. The objective moving mechanism 11 moves the diopter adjustment group 1*a* of the objective optical system 1 along the optical axis Ax in a case where an objective diopter adjustment dial (not shown) is operated. Accordingly, the diopter adjustment is performed. The eyepiece moving mechanism 12 moves a diopter adjustment group of the ocular optical system 2 along the optical axis Ax in a case where an eyepiece diopter adjustment dial (not shown) is operated. Accordingly, the diopter adjustment is performed.

The sensor 13 detects a movement amount from a reference position of the diopter adjustment group 1*a* and outputs position information of the diopter adjustment group 1*a* to the processor 16. For example, a potentiometer and a linear encoder can be used as the sensor 13. In a case where an output value from the sensor 13 is an analog value, the output value is subjected to analog to digital (A/D) conversion and is then input to the processor 16. The processor 16 controls each unit in the finder 10 by executing a control program in cooperation with a memory (not shown). In a case where the finder 10 is mounted on the camera body 20, the processor 16 and a body processor 29 can perform communication through the connecting part. The processor 16 may be configured with, for example, a central processing unit (CPU).

The objective moving mechanism 11 also functions as an example of a "condensing position variable mechanism" according to the technique of the present disclosure. In a case where the diopter adjustment group 1*a* is moved, a condensing position of light from the objective optical system 1 is changed. The memory of the processor 16 stores the position information of the diopter adjustment group 1*a* in a state in which the condensing position of light from the objective optical system 1 becomes a position different from the display element 3. In a case where a signal indicating that the power of the camera 100 is s witched from ON to OFF is received, the processor 16 determines that the camera 100 is brought into an unused state, and operates the objective moving mechanism 11 to move the diopter adjustment group 1*a* such that the condensing position of light from the objective optical system 1 becomes a position different from the display element 3.

The display element 3 has light transmittance, and is configured with, for example, a transmissive display. As the transmissive display, a thin self-luminescence type organic electro luminescence (EL) panel or the like can be used. Furthermore, brightness (luminance) of each region of the image display surface of the display element 3 is variable, and can be controlled for each region. The display element 3 displays an image on the image display surface based on a signal from the processor 16.

The light shielding member 4 is a light control member that shields at least a part of luminous flux emitted from the objective optical system 1. The light shielding member 4 may be configured with, for example, a macromolecular dispersion type liquid crystal panel, an electrochromic sheet, and/or a neutral density (ND) filter as a light reduction filter.

A light shielding ratio of the light shielding member 4 is variable. It is preferable that the light shielding ratio of the light shielding member 4 is variable in a range of about 0% to about 100%. In a case where the light shielding ratio of the light shielding member 4 is about 0%, the user 8 observes an image in which the optical image OP and the image displayed on the display element 3 are superimposed. In a case where the light shielding ratio of the light shielding member 4 is about 100%, because light of the optical image OP is shielded, the user 8 observes only the image displayed on the display element 3.

A region that is shielded by the light shielding member 4 is variable. A region to be shielded can be changed to any position, whereby it is possible to freely select a region of the optical image OP and a region of the image displayed on the display element 3. The light shielding ratio of the light shielding member 4 can be controlled for each region of the light shielding member 4. The light shielding ratio of each region of the light shielding member 4 may be set to any value by the user 8. The light shielding ratio of the light shielding member 4 is changed depending on, for example, an electrical signal input to the light shielding member 4. The processor 16 controls the light shielding ratio of the light shielding member 4 based on, for example, a signal from the optical sensor 14 described below. The processor 16 can also control the light shielding ratio of the light shielding member 4, for example, by receiving an operation instruction input from the user 8 through the operation unit 24.

It is preferable that the light shielding member 4 is configured to cover the entire display element 3 such that light transmitted through the display element 3 can be sufficiently shielded. For this reason, it is preferable that a plane size of the light shielding member 4 is equal to or greater than a plane size of the image display surface of the display element 3. The light shielding member 4 may be disposed on the object side of the display element 3 or may be disposed on the eye point EP side. In a case where the light shielding member 4 is disposed on the object side of the display element 3, it is possible to reduce the amount of light incident on the display element 3 by increasing the light shielding ratio of the light shielding member 4, and to suppress deterioration of the display element 3.

The optical sensor 14 is a photometric sensor. The optical sensor 14 is provided in the finder 10 and outputs a signal according to intensity of light (hereinafter, referred to as ambient light) in an imaging environment. An output signal of the optical sensor 14 is transmitted to the processor 16. In the present example, although the optical sensor 14 is provided in the finder 10, the optical sensor 14 is not limited to the configuration. The optical sensor 14 may be provided in the camera body 20.

The camera body 20 comprises an imaging lens 27, an imaging element 28, and a body processor 29. The imaging lens 27 consists of a plurality of lenses, but is conceptually shown in FIG. 9.

The imaging lens 27 forms an image of the subject. The imaging element 28 captures an image formed by the imaging lens 27. As the imaging element 28, for example, a charge coupled device (CCD) image sensor or a complementary metal oxide semiconductor (CMOS) image sensor can be used. The imaging element 28 outputs a captured image that is an image of the captured image, to the body processor 29.

The body processor 29 executes image processing on the captured image and transmits image data subjected to the image processing to the processor 16, and the processor 16 outputs the transmitted image data to the display element 3. The display element 3 displays an image based on the input image data. Hereinafter, out of the image displayed on the display element 3, an image based on image data obtained by way of the imaging element 28 is referred to as an image P.

The body processor 29 may be configured with one or a plurality of hardware devices, for example, a central processing unit (CPU), a field programmable gate array (FPGA), a digital signal processor (DSP), an application specific integrated circuit (ASIC), a graphics processing unit (GPU), or other integrated circuits (ICs). Alternatively, the body processor 29 may be configured by combining such ICs. The body processor 29 controls each unit of the camera body 20 by executing a control program in cooperation with a memory (not shown).

Figure 10:
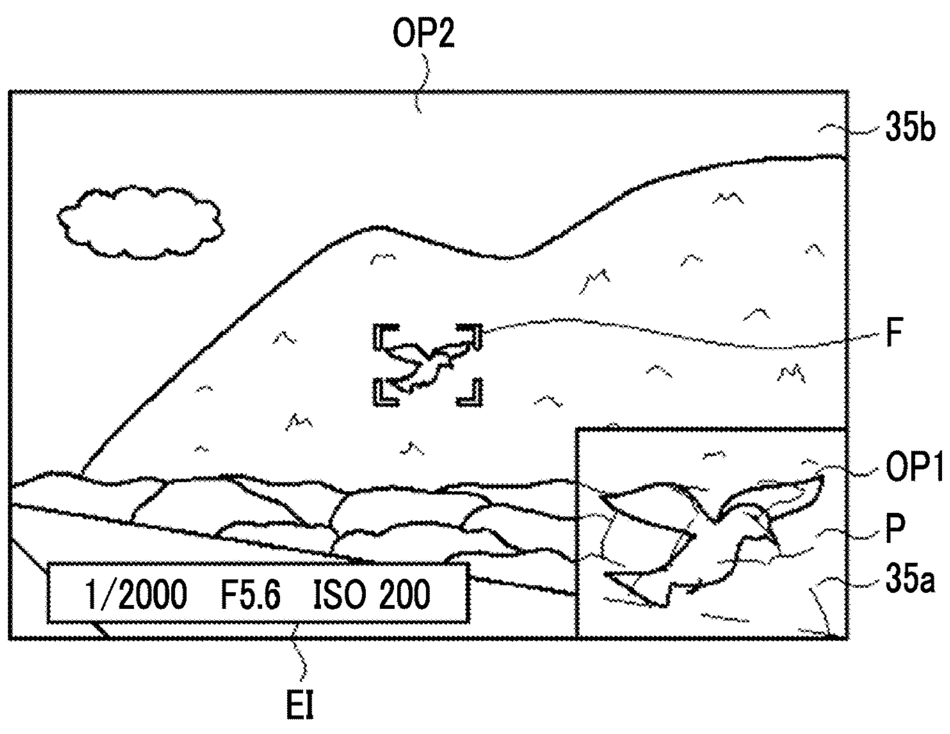
FIG. 10 is a diagram showing an example of an image observed by the finder and an optical image.

In the camera 100, in a case where the light shielding ratio of the light shielding member 4 is sufficiently low, the user 8 can look into the eyepiece window 18 and can observe an image shown in FIG. 10 as an example, in which the optical image OP formed by the objective optical system 1 and the image P displayed on the display element 3 are superimposed.

Figure 11:
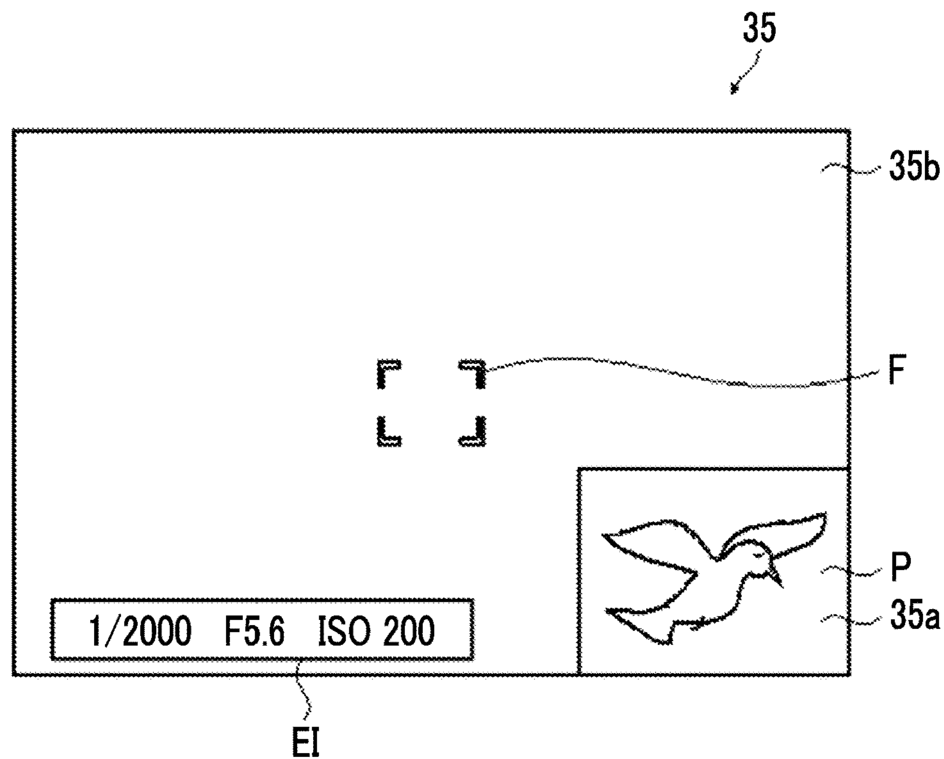
FIG. 11 is an example of an image that is displayed on a display element.
Figure 12:
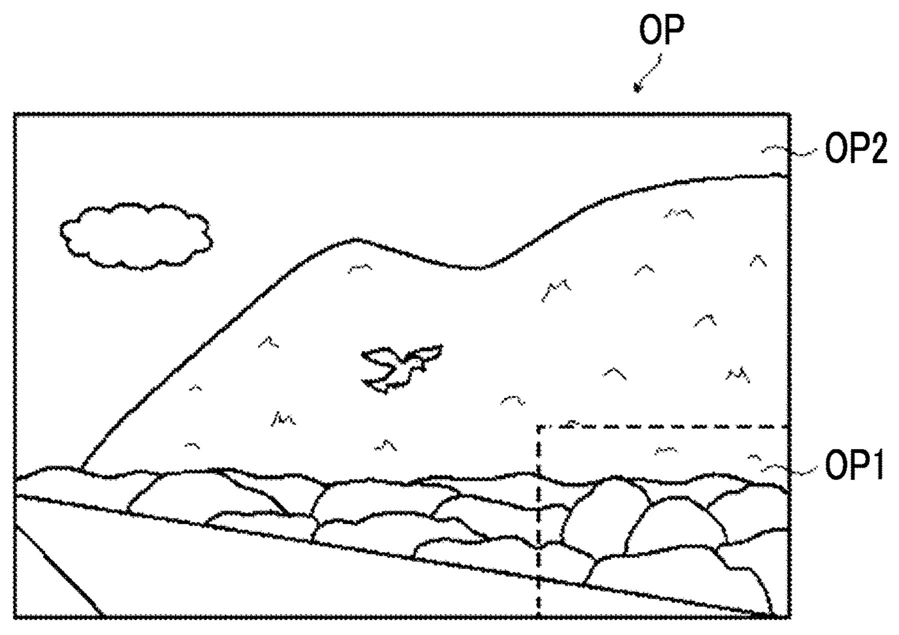
FIG. 12 is an example of an optical image.

For ease of understanding, only the image displayed on the display element 3 out of the image of FIG. 10 is shown in FIG. 11, and only the optical image OP is shown in FIG. 12. In the present example, as shown in FIG. 11, images displayed on an image display surface 35 of the display element 3 are a marker F and setting information EI in addition to the image P. The marker F is a frame that surrounds a region indicating an imaging range (angle of view) of the imaging element 28, an L-shaped mark indicating a boundary position of the region, or the like. The body processor 29 specifies a positional relationship between the optical image OP of the subject and the imaging range of the imaging element 28 based on the specification of the imaging lens 27 and information regarding each unit of the finder 10 and displays the marker F on the display element 3 according to the specified positional relationship. The setting information EI is information including exposure conditions, such as a shutter speed, an F-Number, and International Organization for Standardization (ISO) sensitivity.

In the image display surface 35 of the display element 3, a region where the image P is displayed is referred to as a first display region 35*a*, and a region other than the first display region 35*a* is referred to as a second display region 35*b*.

As shown in FIG. 12, it can be considered that a region of the optical image OP is divided into a region superimposed on the image P and a region not superimposed on the image P. In the region of the optical image OP, the region superimposed on the image P is referred to as a first optical region OP1, and the region not superimposed on the image P is referred to as a second optical region OP2. That is, the first optical region OP1 is a region corresponding to the first display region 35*a*, and the second optical region OP2 is a region corresponding to the second display region 35*b*. In the example of FIG. 10, because the light shielding ratio of the light shielding member 4 is sufficiently low, the optical image OP of the first optical region OP1 is seen through with respect to the image P displayed in the first display region 35*a*.

A size and a position of the first display region 35*a* where the image P is displayed can be changed optionally as long as the first display region 35*a* is within the image display surface 35. For example, in a case where an input operation of the user 8 is received, the processor 16 sets the size and the position of the first display region 35*a* based on operation contents. Furthermore, in a case where a change instruction of the user 8 regarding the first display region 35*a* is received, the processor 16 changes the size or the position of the first display region 35*a* according to instruction contents.

Figure 13:
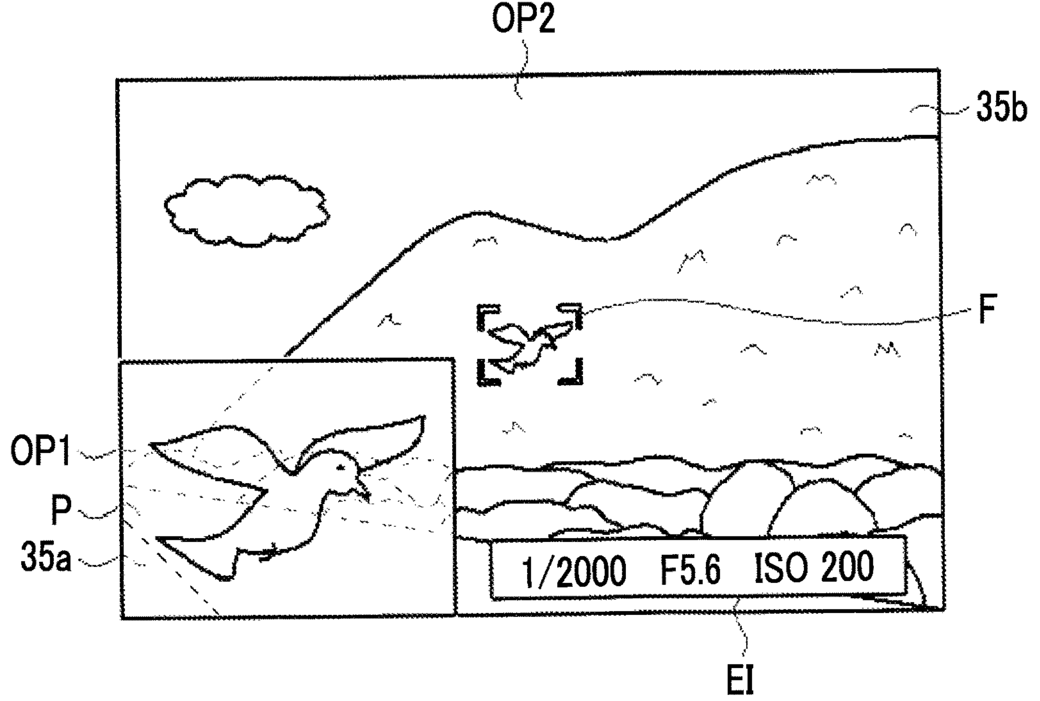
FIG. 13 is a diagram showing a change example of a size and a display position of a first display region.

In FIG. 13 as an example, an example of a case where the size and the position of the first display region 35*a* are changed from the example of FIG. 10 is shown. In the example of FIG. 13, the size of the image P is increased, the position of the image P is changed to a lower left corner, and the position of the setting information EI is also changed with the change of the position of the image P, compared to the example of FIG. 10.

In the light shielding member 4, a region corresponding to the first optical region OP1 is referred to as a first light shielding region 4*a*, and a region corresponding to the second optical region OP2 is referred to as a second light shielding region 4*b*. The first light shielding region 4*a* and the second light shielding region 4*b* in a case where the image of FIG. 10 is observed are shown in an upper view of FIG. 14. Because the light shielding ratio of the light shielding member 4 can be controlled for each region of the light shielding member 4, a light shielding ratio of the first light shielding region 4*a* and a light shielding ratio of the second light shielding region 4*b* can be individually controlled. Accordingly, the visibility (brightness) of each of the optical image OP and the image P can be independently adjusted according to situations. For example, the light shielding ratio of each light shielding region in the light shielding member 4 is controlled based on intensity of ambient light, whereby it is possible to improve the visibility of both of the optical image OP and the image P that are observed by the finder 10.

Figure 14:
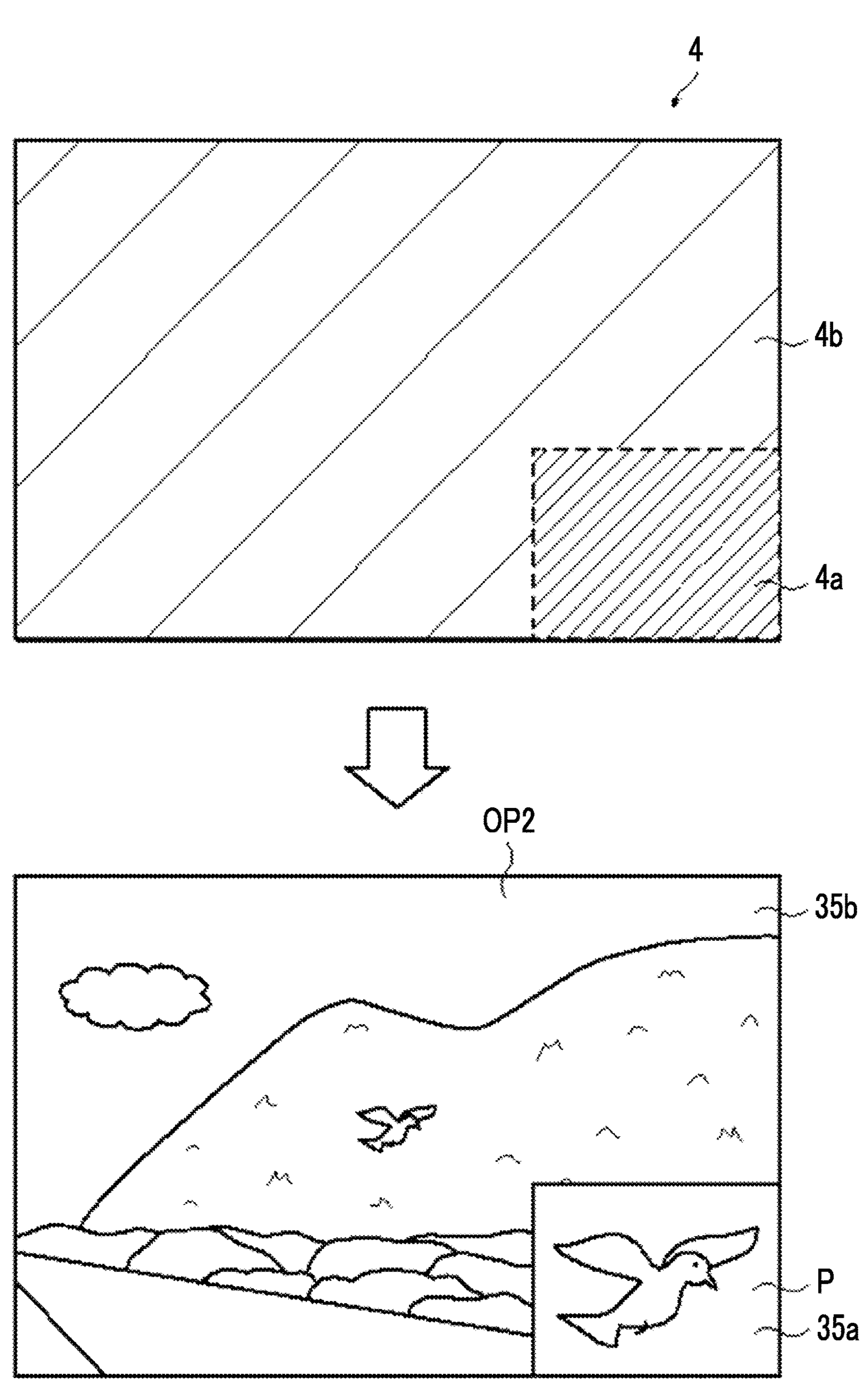
FIG. 14 is a diagram illustrating observation in a situation in which intensity of ambient light is high.

In a case where the intensity of ambient light is high, the optical image OP is seen brightly. Thus, in a case where the optical image OP having brightness is made to be transmitted through the display element 3, the visibility of the image P superimposed on the first optical region OP1 is reduced. In such a case, the processor 16 controls the light shielding member 4 to set the light shielding ratio of the first light shielding region 4*a* to be sufficiently higher than the second light shielding region 4*b*. Specifically, the processor 16 detects the intensity of ambient light from the output signal of the optical sensor 14 and controls the light shielding ratio of the second light shielding region 4*b* based on a detection result. The processor 16 controls the light shielding ratio of the first light shielding region 4*a* based on the output signal of the optical sensor 14 and a signal generated by the imaging element 28. For example, the light shielding ratio of the first light shielding region 4*a* is set to about 100%. Then, as shown in a lower view of FIG. 14, even in a case where the intensity of ambient light is excessively strong, it is possible to improve the visibility of the image P while keeping the brightness of the optical image OP. Alternatively, in the first display region 35*a*, in a case where the first optical region OP1 and the image P are to be viewed to the user 8 together, the light shielding ratio may be set to, for example, about 50 to 90%. In FIG. 14, the setting information EI and the marker F are not shown.

In contrast to the above-described example, there is also a case where the intensity of ambient light is low. For example, there is a case where the imaging environment is an outdoor space at night, or the like. In a dark environment, there is a case where the detected intensity of ambient light falls below a reference value determined in advance. In such a case, because a need for confirming the optical image OP of the subject is reduced, the processor 16 may increase the light shielding ratios of both of the first light shielding region 4*a* and the second light shielding region 4*b* to a value near an upper limit value. Then, the processor 16 may enlarge the image P and may display the image P on the entire image display surface 35. Accordingly, the user 8 can focus on confirmation of the image P without seeing the optical image OP. With the finder 10 having the above-described configuration, various use methods can be applied.

Figure 15:
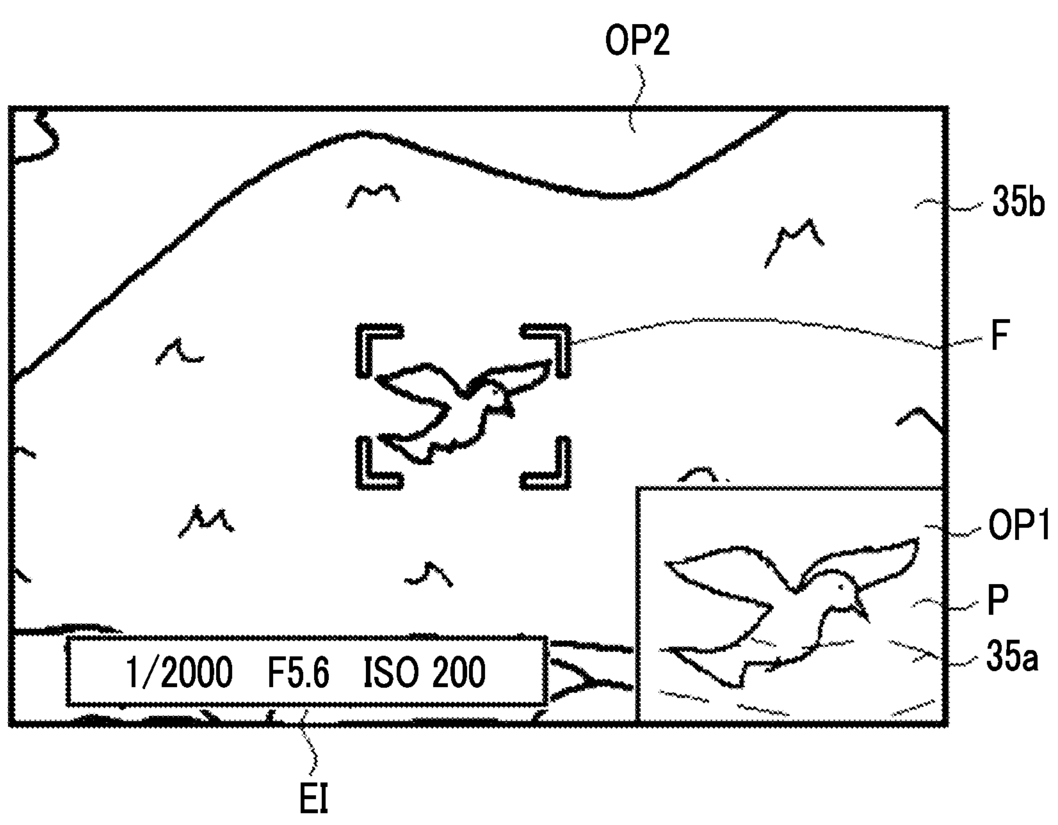
FIG. 15 is a diagram illustrating observation in a case where the finder is zoomed.

In the finder 10 having a zooming function, the optical image OP can be zoomed. Thus, in a case where a subject, such as a distant bird, is imaged using a telephoto type imaging lens 27, there are the following use methods. At first, the user 8 sets the objective optical system 1 of the finder 10 on a wide angle side, and searches for a subject in a wide range while looking into the finder 10. In this state, as shown in FIG. 10, the angle of view of the optical image OP is wide. In a case where it is confirmed that the subject is included in the optical image OP, the user 8 matches the marker F to the subject to image the subject with the imaging lens 27. Note that, because the telephoto type imaging lens 27 generally has a narrow angle of view, the range of the marker F is a small range. In such a case, it is difficult to match the marker F of the small range to the distant subject seen to be small while looking into the finder 10. In particular, it is difficult in a case where the subject is a moving object. Accordingly, in a case where the objective optical system 1 of the finder 10 is zoomed and is on the telephoto side, the user 8 can observe the enlarged optical image OP as shown in FIG. 15 and can observe the enlarged subject and marker F compared to before zooming. Thus, it becomes easy to match the marker F to the subject.

Next, examples of the finder of the present disclosure will be described referring to the drawings. The reference numerals attached to the lenses in the cross-sectional view of each example are used independently for each example to avoid complication of description and drawings due to an increase in the number of digits of the reference numerals. Therefore, even though common reference numerals are applied in the drawings of different examples, components do not necessarily have a common configuration.

Example 1

The configuration and luminous flux of a finder of Example 1 are shown in FIG. 1, and because an illustration method thereof is as described above, overlapping description will be partially omitted. The finder of Example 1 comprises, in order from the object side to the eye point EP side along the optical path, the objective optical system 1, the light shielding member 4, the display element 3, the ocular optical system 2, and the optical member CG.

The objective optical system 1 consists of, in order from the object side to the eye point EP side, a first lens group G1, a second lens group G2, a third lens group G3, a fourth lens group G4, a first prism P1, and a lens L8. The first lens group G1 consists of two lenses of lenses L1 and L2. The second lens group G2 consists of two lenses of lenses L3 and L4. The third lens group G3 consists of one lens of a lens L5. The fourth lens group G4 consists of two lenses of lenses L6 and L7. During zooming from the wide angle end to the telephoto end, the second lens group G2 is moved to the eye point EP side along the optical axis Ax, the fourth lens group G4 is moved to the object side along the optical axis Ax, and the first lens group G1 and the third lens group G3 are fixed. The diopter adjustment group of the objective optical system 1 consists of one lens of the lens L5.

The ocular optical system 2 consists of, in order from the object side to the eye point EP side along the optical path, a second prism P2 and three lenses of lenses L21 to L23. The diopter adjustment group of the ocular optical system 2 consists of three lenses of the lenses L21 to L23. Each of the first prism P1 and the second prism P2 includes a reflecting surface for forming an erect image.

In regard to the finder of Example 1, basic lens data is shown in Table 1, specifications and variable surface spacings are shown in Table 2, and aspherical coefficients are shown in Table 3.

Table 1 is described as follows. The column of Sn shows a surface number in a case where a most object-side surface is a first surface and the number is increased one by one toward the eye point EP side. The column of R shows a radius of curvature of each surface. The column of D shows a surface spacing between each surface and a surface adjacent to the eye point EP side on the optical axis Ax. The column of Nd shows a refractive index of each component with respect to the d line. The column of νd shows an Abbe's number of each component based on the d line.

In Table 1, a sign of a radius of curvature of a surface convex toward the object side is positive, and a sign of a radius of curvature of a surface convex toward the eye point EP side is negative. In Table 1, the surface number and (MI) are noted in the column of the surface number of the surface corresponding to the intermediate image MI, and the surface number and (EP) are noted in the column of the surface number of the surface corresponding to the eye point EP. In Table 1, the symbol DD[ ] is used for each variable surface spacing during diopter adjustment and zooming, and the surface number of the spacing on the object side is given in [ ] and is noted in the column of D.

Table 2 shows values of magnification, a viewing angle 2*o*) at a full angle of view, and the variable surface spacing in each zoom state and each object distance. "Wide Angle End" and "Telephoto End" in the first row of Table 2 indicate the zoom state. "Infinity" and "3 m" in the second row of Table 2 each indicate that the object distance is infinity and 3 m (meter). The object distance is a distance from an object to a most object-side lens surface of the finder on the optical axis Ax. "Magnification" is a finder magnification. (°) in the cell of 2ω indicates that the unit thereof is a degree. Table 2 shows data of the diopter at the value shown in Table 2. "dpt" in the row of the diopter means diopter.

In the basic lens data, a mark "*" is attached to the surface number of an aspherical surface, and a numerical value of a paraxial radius of curvature is described in the column of the radius of curvature of the aspherical surface. In Table 3, the row of Sn shows the surface number of the aspherical surface, and the rows of KA and Am (where m=3, 4, 5, . . . , and 16) show numerical values of the aspherical coefficients for each aspherical surface. The "E±n" (n: an integer) in the numerical value of the aspherical coefficient of Table 3 indicates "$\times 10^{\pm n}$". Note that KA and Am are the aspherical coefficients in an aspherical surface equation represented by the following expression.

$$Zd=C\times h^2/\{1+(1-KA\times C^2\times h^2)^{1/2}\}\Sigma Am\times h^m$$

Here,

Zd: an aspherical depth (a length of a vertical line from a point on an aspherical surface of a height h to a plane perpendicular to optical axis Ax in contact with an aspherical surface apex)

h: a height (a distance from the optical axis Ax to the lens surface)

C: a reciprocal of a paraxial radius of curvature, and

KA, Am: aspherical coefficients, and

Σ in the aspherical surface expression means the sum regarding m.

Hereinafter, in data of each table, degree is used as the unit of angle and millimeter (mm) is used as the unit of length; however, other appropriate units can also be used because the optical system is usable even though the optical system is proportionally enlarged or proportionally reduced. In the following tables, numerical values are rounded to a predetermined digit.

TABLE 1

Example 1

| Sn | R | D | Nd | νd |
|---|---|---|---|---|
| 1 | 29.1736 | 8.2273 | 1.74931 | 53.07 |
| 2 | −76.0596 | 1.5620 | 1.96248 | 31.09 |
| 3 | 275.4262 | DD[3] | | |
| 4 | −1286.3269 | 2.1532 | 1.56781 | 69.57 |
| 5 | 14.8370 | 3.7020 | | |
| 6 | −18.2855 | 0.8000 | 1.53574 | 74.50 |
| 7 | 139.6677 | DD[7] | | |
| 8 | 31.6721 | 1.5997 | 1.89014 | 38.99 |
| 9 | 101.0004 | DD[9] | | |
| *10 | 30.0007 | 4.1229 | 1.69680 | 55.46 |
| *11 | −18.2963 | 0.1043 | | |
| 12 | −22.9586 | 0.8003 | 1.94859 | 17.57 |
| 13 | −43.5726 | DD[13] | | |
| 14 | ∞ | 37.6022 | 1.51680 | 64.20 |
| 15 | ∞ | 0.1000 | | |
| 16 | ∞ | 1.2354 | 1.94999 | 33.00 |
| 17 | −27.5259 | 1.8407 | | |
| 18 | ∞ | 1.0000 | 1.51680 | 64.20 |
| 19(MI) | ∞ | 0.0000 | | |
| 20 | ∞ | 1.0000 | 1.51680 | 64.20 |
| 21 | ∞ | 2.0819 | | |
| 22 | ∞ | 12.5501 | 1.51680 | 64.20 |
| 23 | ∞ | 1.7371 | | |
| 24 | −708.4703 | 3.6584 | 1.87721 | 40.28 |
| 25 | −15.6403 | 1.1508 | | |
| *26 | −9.3839 | 0.9831 | 1.63351 | 23.63 |
| *27 | −50.7923 | 0.2350 | | |
| *28 | 33.5448 | 4.5790 | 1.53389 | 55.98 |
| *29 | −13.2342 | 1.4478 | | |
| 30 | ∞ | 1.2000 | 1.49023 | 57.49 |
| 31 | ∞ | 15.0000 | | |
| 32(EP) | ∞ | | | |

TABLE 2

Example 1

| | Wide Angle End Infinity | Telephoto End Infinity | Wide Angle End 3 m | Telephoto End 3 m |
|---|---|---|---|---|
| Magnification | −1.00 | −2.99 | −0.99 | −2.95 |
| 2ω(°) | 32.6 | 10.4 | 32.6 | 10.4 |
| Diopter | −1.0 dpt | −1.0 dpt | −1.0 dpt | −1.0 dpt |
| DD[3] | 1.7960 | 15.1829 | 1.7960 | 15.1829 |
| DD[7] | 14.0391 | 0.6522 | 14.2830 | 1.8596 |
| DD[9] | 8.4411 | 3.5468 | 8.1972 | 2.3394 |
| DD[13] | 0.3000 | 5.1943 | 0.3000 | 5.1943 |

TABLE 3

Example 1

| Sn | 10 | 11 | 26 |
|---|---|---|---|
| KA | −1.6742567E−01 | 1.2593867E+00 | 7.4338441E−01 |
| A3 | 0.0000000E+00 | 0.0000000E+00 | 0.0000000E+00 |
| A4 | −1.2779837E−04 | −1.0066862E−05 | 7.2467668E−04 |
| A5 | 1.2658150E−04 | −8.2034210E−05 | −1.0702021E−06 |
| A6 | −8.1735809E−05 | 1.4008880E−04 | −7.9319598E−05 |
| A7 | 3.9059318E−05 | −8.0747557E−05 | 1.8594580E−05 |
| A8 | −1.2469208E−05 | 2.3167243E−05 | −6.4403297E−06 |

TABLE 3-continued

| Example 1 | | | |
|---|---|---|---|
| A9 | 2.1056925E−06 | −3.2717218E−06 | 2.4634091E−06 |
| A10 | −4.3564766E−08 | 8.3400280E−08 | −2.5623362E−07 |
| A11 | −4.4874581E−08 | 4.1194245E−08 | −8.2244700E−08 |
| A12 | 5.9327499E−09 | −5.0711151E−09 | 2.6317163E−08 |
| A13 | 1.7104232E−10 | −6.5659364E−11 | −2.8831731E−09 |
| A14 | −9.8138333E−11 | 5.8899833E−11 | 1.3323434E−10 |
| A15 | 8.2637851E−12 | −4.8158970E−12 | −2.8209599E−12 |
| A16 | −2.3517504E−13 | 1.3326371E−13 | 1.0016097E−13 |
| Sn | 27 | 28 | 29 |
| KA | −1.3438750E+00 | 5.0000073E+00 | −2.6736536E−01 |
| A3 | 0.0000000E+00 | 0.0000000E+00 | 0.0000000E+00 |
| A4 | 8.5343231E−04 | −1.1419479E−04 | −1.2045975E−04 |
| A5 | −1.7604209E−05 | 1.4130254E−04 | −8.4185049E−06 |
| A6 | −8.6861952E−05 | −9.6047746E−05 | 1.0661048E−06 |
| A7 | −3.4441544E−06 | 1.9634931E−05 | 8.7091264E−06 |
| A8 | 4.3649774E−06 | −5.0030461E−06 | −4.6906431E−06 |
| A9 | 6.6154975E−07 | 1.5932975E−06 | 1.0332537E−06 |
| A10 | −2.9623483E−07 | −1.0823917E−07 | −6.9393828E−08 |
| A11 | 2.6890649E−09 | −4.3951896E−08 | −7.1809070E−09 |
| A12 | 7.2120537E−09 | 6.7219612E−09 | −2.1689897E−10 |
| A13 | −9.4824625E−10 | 2.5959308E−10 | 4.6625510E−10 |
| A14 | 7.1501569E−11 | −9.6199552E−11 | −6.4162797E−11 |
| A15 | −5.9355317E−12 | 4.5444473E−12 | 3.1271839E−12 |
| A16 | 2.8359612E−13 | 7.2452622E−15 | −3.7582877E−14 |

Figure 16:
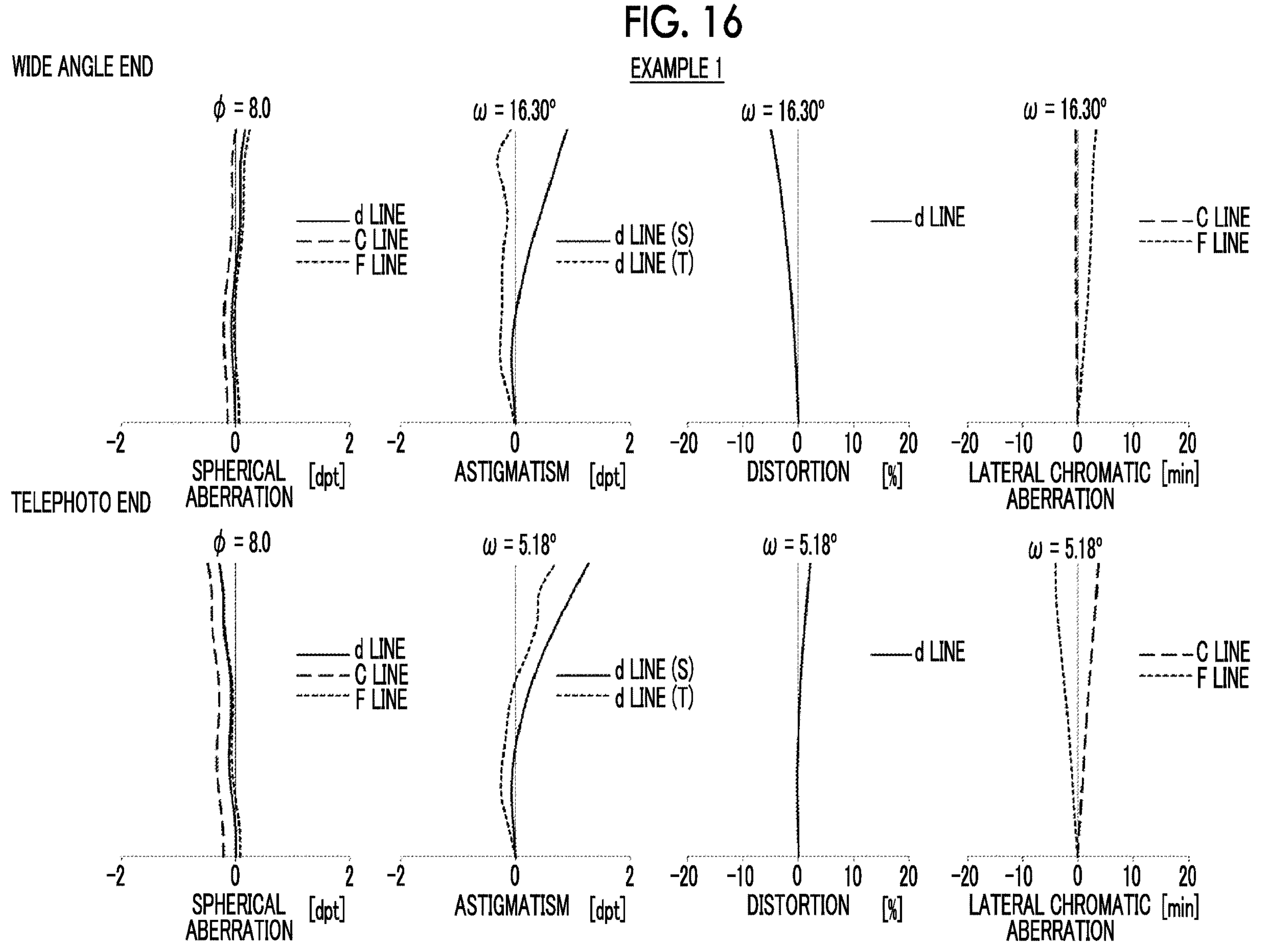
FIG. 16 shows respective aberration diagrams of the finder of Example 1.

FIG. 16 shows respective aberration diagrams of the finder of Example 1 in a state in which the diopter is −1.00. FIG. 16 shows, in order from the left, a spherical aberration, astigmatism, distortion, and a lateral chromatic aberration. In FIG. 16, an upper part labeled "wide angle end" indicates an aberration in the wide angle end state, and a lower part labeled "telephoto end" indicates an aberration in the telephoto end state. In the spherical aberration diagram, aberrations at the d line, the C line, and the F line are indicated by a solid line, a long broken line, and a short broken line, respectively. In the astigmatism diagram, an aberration in a sagittal direction at the d line is shown by a solid line, and an aberration in a tangential direction at the d line is shown by a short broken line. In the distortion diagram, an aberration at the d line is shown by a solid line. In the lateral chromatic aberration diagram, aberrations at the C line and the F line are shown by a long broken line and a short broken line, respectively. The unit dpt on the horizontal axes of the spherical aberration diagram and the astigmatism diagram means diopter. The unit min on the horizontal axis of the lateral chromatic aberration diagram means a minute of angle. In the spherical aberration diagram, a value of a diameter of the eye point EP in a case where the unit is mm (millimeter) is shown after "Φ=". In other aberration diagrams, a value of a viewing angle at a half angle of view is shown after "ω=".

A symbol, a meaning, a description method, and an illustration method of each data regarding Example 1 described above are the same as those in the following examples unless otherwise noted. Therefore, in the following description, overlapping description will be omitted.

Example 2

Figure 17:
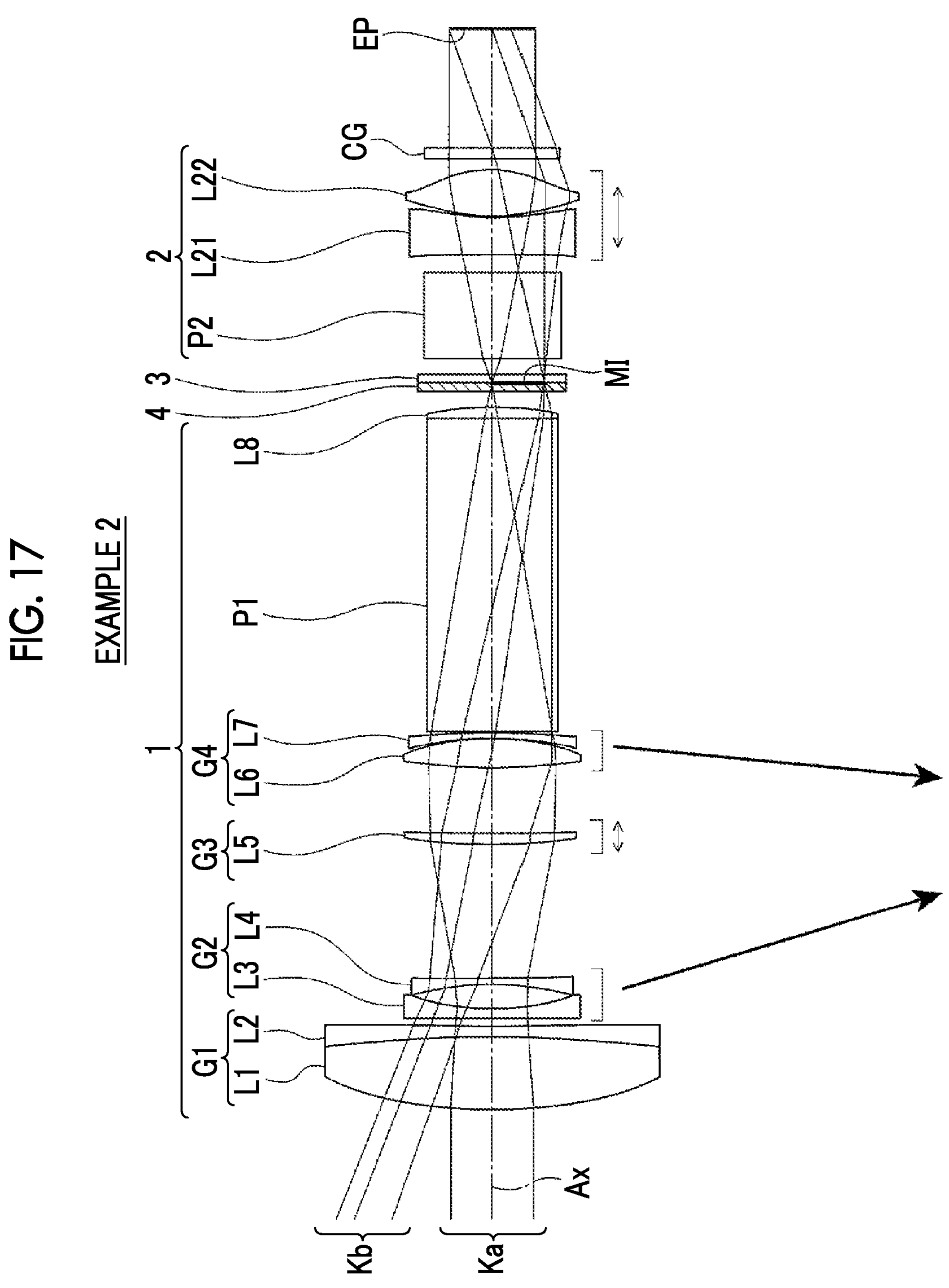
FIG. 17 is a cross-sectional view showing a configuration and luminous flux of a finder of Example 2.

The configuration and luminous flux of a finder of Example 2 are shown in FIG. 17. The finder of Example 2 comprises, in order from the object side to the eye point EP side along the optical path, the objective optical system 1, the light shielding member 4, the display element 3, the ocular optical system 2, and the optical member CG.

The objective optical system 1 consists of, in order from the object side to the eye point EP side, a first lens group G1, a second lens group G2, a third lens group G3, a fourth lens group G4, a first prism P1, and a lens L8. The first lens group G1 consists of two lenses of lenses L1 and L2. The second lens group G2 consists of two lenses of lenses L3 and L4. The third lens group G3 consists of one lens of a lens L5. The fourth lens group G4 consists of two lenses of lenses L6 and L7. During zooming from the wide angle end to the telephoto end, the second lens group G2 is moved to the eye point EP side along the optical axis Ax, the fourth lens group G4 is moved to the object side along the optical axis Ax, and the first lens group G1 and the third lens group G3 are fixed. The diopter adjustment group of the objective optical system 1 consists of one lens of the lens L5.

The ocular optical system 2 consists of, in order from the object side to the eye point EP side along the optical path, a second prism P2, and two lenses of lenses L21 and L22. The diopter adjustment group of the ocular optical system 2 consists of two lenses of the lenses L21 and L22. Each of the first prism P1 and the second prism P2 includes a reflecting surface for forming an erect image.

Figure 18:
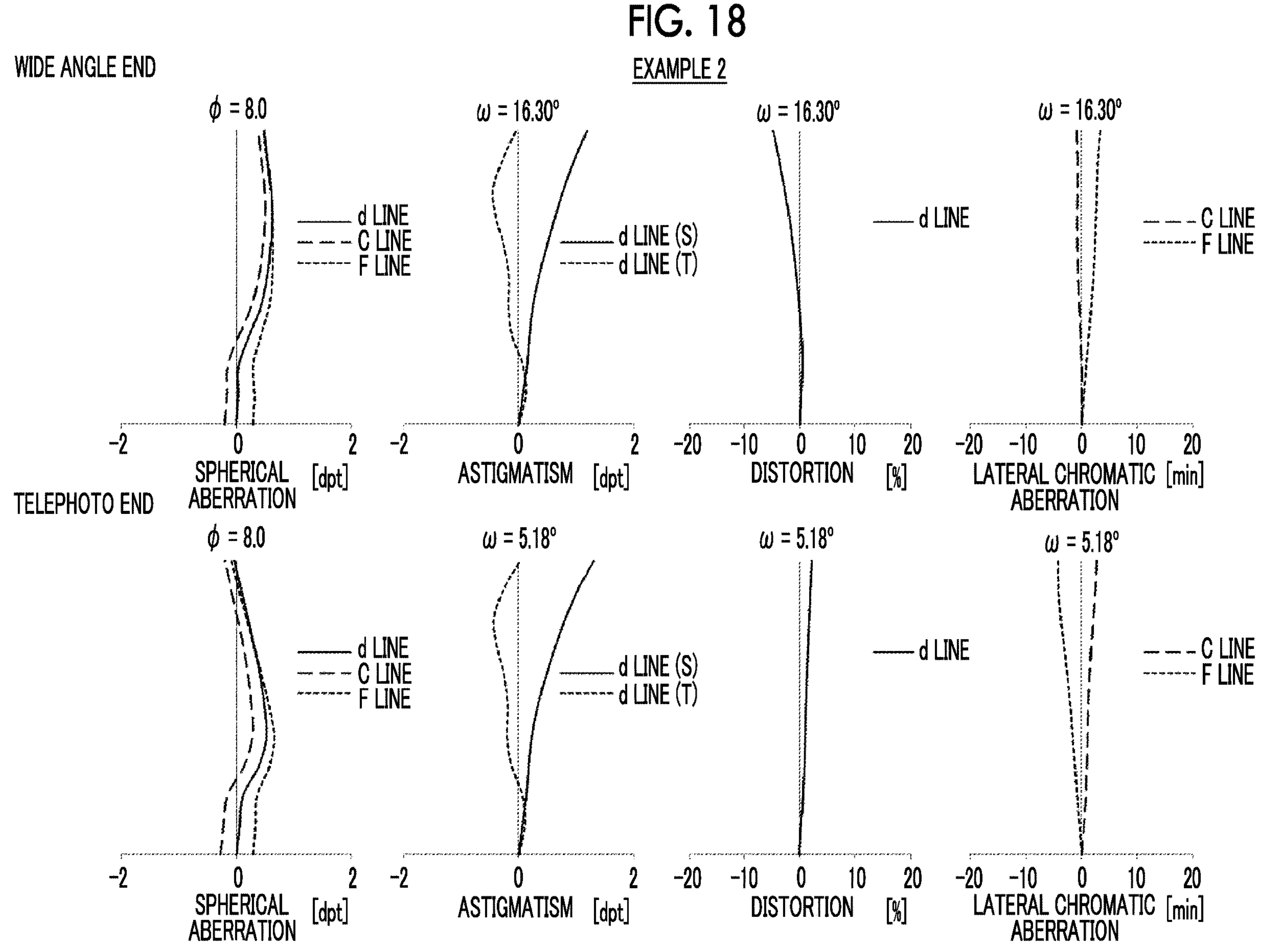
FIG. 18 shows respective aberration diagrams of the finder of Example 2.

In regard to the finder of Example 2, basic lens data is shown in Table 4, specifications and variable surface spacings are shown in Table 5, aspherical coefficients are shown in Table 6, and aberration diagrams in a state in which the diopter is −1.00 are shown in FIG. 18.

TABLE 4

| Example 2 | | | | |
|---|---|---|---|---|
| Sn | R | D | Nd | νd |
| 1 | 31.8335 | 9.5409 | 1.73837 | 54.16 |
| 2 | −87.7267 | 0.8768 | 1.92021 | 31.84 |
| 3 | 207.4016 | DD[3] | | |
| 4 | 2021.3851 | 1.1889 | 1.52679 | 75.88 |
| 5 | 16.9133 | 3.2026 | | |
| 6 | −19.2247 | 0.7833 | 1.51664 | 77.44 |
| 7 | 169.5018 | DD[7] | | |
| 8 | 32.1264 | 1.2734 | 1.85378 | 33.27 |
| 9 | 87.2495 | DD[9] | | |
| *10 | 31.6683 | 3.6406 | 1.69350 | 53.18 |
| *11 | −17.9518 | 0.1214 | | |
| 12 | −23.2337 | 0.7903 | 1.94999 | 17.50 |
| 13 | −48.8447 | DD[13] | | |
| 14 | ∞ | 38.8370 | 1.51680 | 64.20 |
| 15 | ∞ | 0.1000 | | |
| 16 | ∞ | 1.3111 | 1.94849 | 33.15 |
| 17 | −26.0565 | 1.9883 | | |
| 18 | ∞ | 1.0000 | 1.51680 | 64.20 |
| 19(MI) | ∞ | 0.0000 | | |
| 20 | ∞ | 1.0000 | 1.51680 | 64.20 |
| 21 | ∞ | 2.1285 | | |
| 22 | ∞ | 10.9399 | 1.51680 | 64.20 |
| 23 | ∞ | 1.7719 | | |
| *24 | −105.2630 | 4.5939 | 1.63351 | 23.63 |
| *25 | 41.6732 | 0.1834 | | |
| *26 | 18.5538 | 5.7525 | 1.53389 | 55.98 |
| *27 | −11.5340 | 1.4462 | | |
| 28 | ∞ | 1.2000 | 1.49023 | 57.49 |
| 29 | ∞ | 15.0000 | | |
| 30(EP) | ∞ | | | |

TABLE 5

| Example 2 | | | | |
|---|---|---|---|---|
| | Wide Angle End Infinity | Telephoto End Infinity | Wide Angle End 3 m | Telephoto End 3 m |
| Magnification | −0.99 | −2.98 | −0.99 | −2.94 |
| 2ω (0) | 32.6 | 10.4 | 32.8 | 10.6 |

TABLE 5-continued

| Example 2 | | | | |
|---|---|---|---|---|
| | Wide Angle End Infinity | Telephoto End Infinity | Wide Angle End 3 m | Telephoto End 3 m |
| Diopter | −1.0 dpt | −1.0 dpt | −1.0 dpt | −1.0 dpt |
| DD[3] | 1.0281 | 17.2727 | 1.0281 | 17.2727 |
| DD[7] | 16.8453 | 0.6007 | 17.1573 | 2.1367 |
| DD[9] | 8.0059 | 3.1888 | 7.6939 | 1.6527 |
| DD[13] | 0.2946 | 5.1117 | 0.2946 | 5.1117 |

TABLE 6

| Example 2 | | | |
|---|---|---|---|
| Sn | 10 | 11 | 24 |
| KA | −1.3610956E+00 | 9.1837430E−01 | 5.0000070E+00 |
| A3 | 0.0000000E+00 | 0.0000000E+00 | 0.0000000E+00 |
| A4 | −9.4143958E−05 | −2.5837467E−04 | 1.0752956E−03 |
| A5 | 7.5715045E−05 | 5.3535967E−04 | 1.5901836E−05 |
| A6 | −3.3903043E−05 | −5.0721265E−04 | −4.0064035E−04 |
| A7 | 1.3657110E−05 | 2.7415308E−04 | 2.7025855E−04 |
| A8 | −6.1767347E−06 | −8.9104035E−05 | −1.0846551E−04 |
| A9 | 1.9655065E−06 | 1.6526254E−05 | 2.8960896E−05 |
| A10 | −3.2837716E−07 | −1.0752311E−06 | −4.3305621E−06 |
| A11 | 2.0716766E−08 | −2.3293941E−07 | −6.5747850E−08 |
| A12 | 3.5716022E−10 | 6.6393765E−08 | 1.7853434E−07 |
| A13 | 1.4218036E−10 | −7.3462596E−09 | −3.7012330E−08 |
| A14 | −5.7571105E−11 | 3.9635620E−10 | 3.6359156E−09 |
| A15 | 5.4138625E−12 | −7.9477709E−12 | −1.7145521E−10 |
| A16 | −1.6824516E−13 | −4.7974342E−14 | 2.8395185E−12 |
| Sn | 25 | 26 | 27 |
| KA | −5.0000090E+00 | 3.7173513E+00 | −6.5997304E−02 |
| A3 | 0.0000000E+00 | 0.0000000E+00 | 0.0000000E+00 |
| A4 | 3.6026342E−03 | 3.7018784E−03 | 1.7088804E−04 |
| A5 | 5.5063439E−04 | 1.7266153E−04 | −1.8192287E−04 |
| A6 | −6.7405353E−04 | −5.0158137E−04 | 3.6842382E−05 |
| A7 | 1.4519949E−04 | 8.6825786E−05 | −9.4315912E−07 |
| A8 | −2.1944333E−05 | −1.3829497E−05 | 7.8667772E−07 |
| A9 | 9.6866855E−07 | 5.0199054E−06 | −6.1986919E−07 |
| A10 | 1.6765553E−06 | −6.2412196E−07 | 1.0023552E−07 |
| A11 | −5.0028015E−07 | −4.0859038E−08 | 2.3109861E−09 |
| A12 | 3.5838355E−08 | 6.6377191E−09 | −2.4293467E−09 |
| A13 | 5.3394822E−09 | 1.5173546E−09 | 4.7586250E−10 |
| A14 | −1.1216418E−09 | −2.8717719E−10 | −7.5979852E−11 |
| A15 | 7.3705871E−11 | 1.5569774E−11 | 7.3015628E−12 |
| A16 | −1.7166878E−12 | −2.3872364E−13 | −2.7533916E−13 |

Example 3

Figure 19:
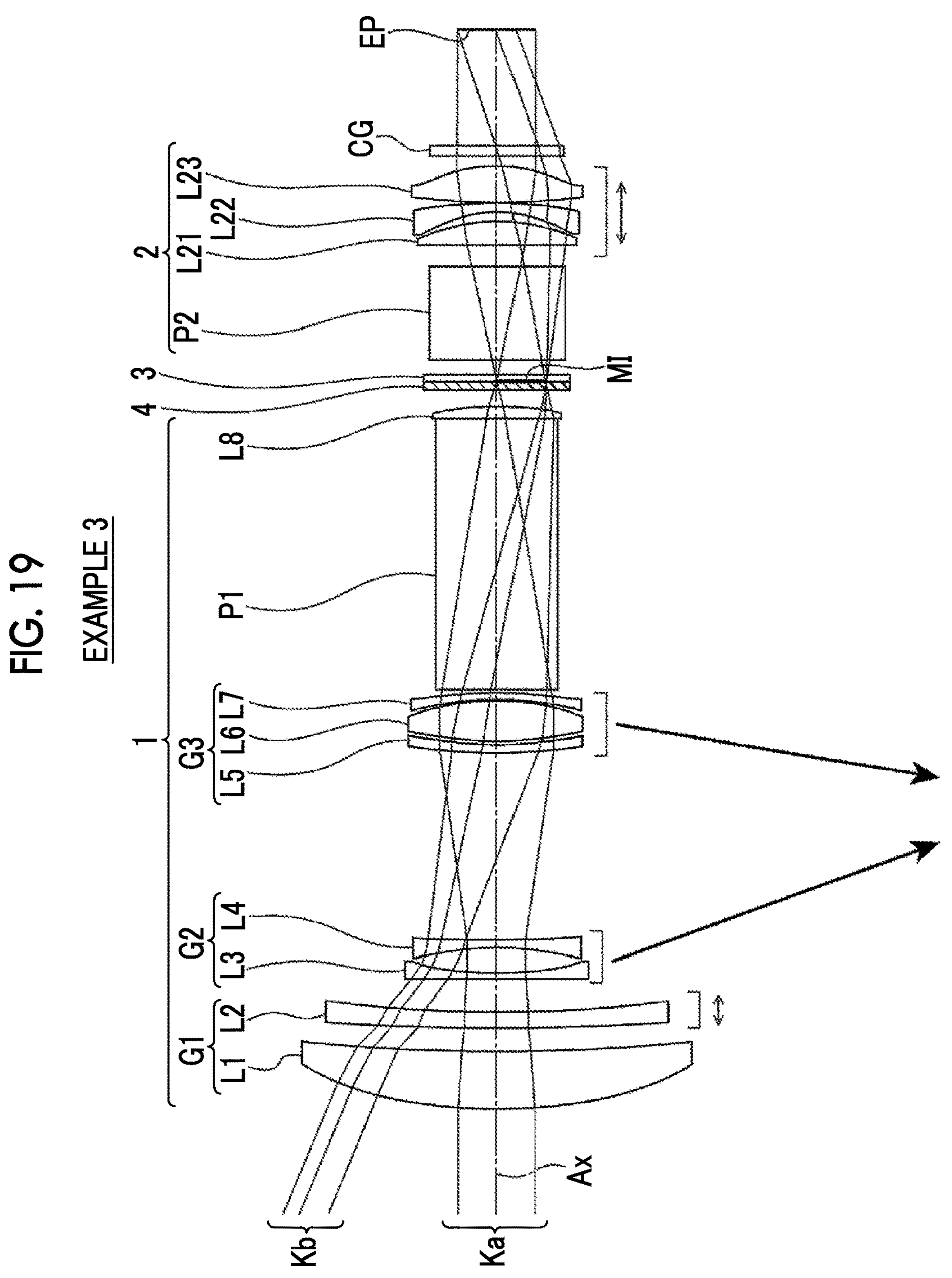
FIG. 19 is a cross-sectional view showing a configuration and luminous flux of a finder of Example 3.

The configuration and luminous flux of a finder of Example 3 are shown in FIG. 19. The finder of Example 3 comprises, in order from the object side to the eye point EP side along the optical path, the objective optical system 1, the light shielding member 4, the display element 3, the ocular optical system 2, and the optical member CG.

The objective optical system 1 consists of, in order from the object side to the eye point EP side, a first lens group G1, a second lens group G2, a third lens group G3, a first prism P1, and a lens L8. The first lens group G1 consists of two lenses of lenses L1 and L2. The second lens group G2 consists of two lenses of lenses L3 and L4. The third lens group G3 consists of three lenses of lenses L5 to L7. During zooming from the wide angle end to the telephoto end, the second lens group G2 is moved to the eye point EP side along the optical axis Ax, the third lens group G3 is moved to the object side along the optical axis Ax, and the first lens group G1 is fixed. The diopter adjustment group of the objective optical system 1 consists of one lens of the lens L2.

The ocular optical system 2 consists of, in order from the object side to the eye point EP side along the optical path, a second prism P2 and three lenses of lenses L21 to L23. The diopter adjustment group of the ocular optical system 2 consists of three lenses of the lenses L21 to L23. Each of the first prism P1 and the second prism P2 includes a reflecting surface for forming an erect image.

Figure 20:
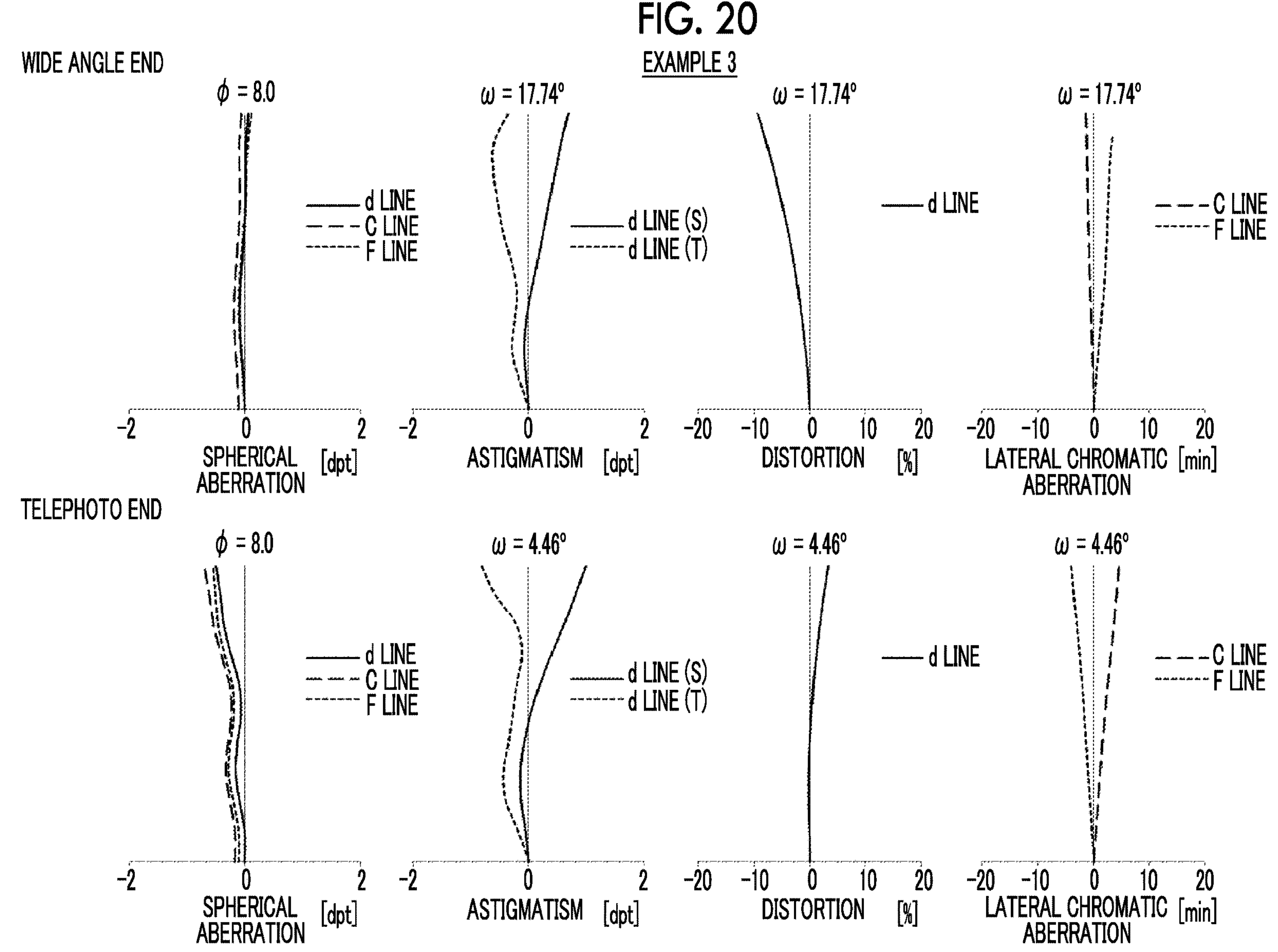
FIG. 20 shows respective aberration diagrams of the finder of Example 3.

In regard to the finder of Example 3, basic lens data is shown in Table 7, specifications and variable surface spacings are shown in Table 8, aspherical coefficients are shown in Table 9, and aberration diagrams in a state in which the diopter is −1.00 are shown in FIG. 20.

TABLE 7

| Example 3 | | | | |
|---|---|---|---|---|
| Sn | R | D | Nd | νd |
| 1 | 34.4287 | 7.6445 | 1.90663 | 37.34 |
| 2 | 168.1512 | DD[2] | | |
| 3 | 249.3710 | 1.9267 | 1.99999 | 15.02 |
| 4 | 83.8083 | DD[4] | | |
| 5 | 125.1315 | 0.8005 | 1.59556 | 65.30 |
| 6 | 26.7717 | 3.1701 | | |
| 7 | −23.7531 | 0.9593 | 1.74915 | 52.27 |
| 8 | 72.5302 | DD[8] | | |
| 9 | 37.0832 | 0.8163 | 1.74665 | 27.67 |
| 10 | 26.6009 | 0.3565 | | |
| *11 | 19.7604 | 5.3665 | 1.77250 | 49.46 |
| *12 | −17.6018 | 0.1000 | | |
| 13 | −24.7086 | 0.8410 | 1.93142 | 18.43 |
| 14 | −51.8692 | DD[14] | | |
| 15 | ∞ | 34.9624 | 1.51680 | 64.20 |
| 16 | ∞ | 0.1000 | | |
| 17 | ∞ | 1.3375 | 1.94999 | 17.50 |
| 18 | −24.7286 | 2.1650 | | |
| 19 | ∞ | 1.0000 | 1.51680 | 64.20 |
| 20 (MI) | ∞ | 0.0000 | | |
| 21 | ∞ | 1.0000 | 1.51680 | 64.20 |
| 22 | ∞ | 2.0907 | | |
| 23 | ∞ | 11.8035 | 1.51680 | 64.20 |
| 24 | ∞ | 2.5721 | | |
| 25 | −168.5483 | 3.1889 | 1.79576 | 36.64 |
| 26 | −13.4297 | 1.2214 | | |
| *27 | −8.9505 | 1.0074 | 1.63351 | 23.63 |
| *28 | −38.7967 | 0.2215 | | |
| *29 | 34.2287 | 4.4435 | 1.53389 | 55.98 |
| *30 | −13.6233 | 1.4574 | | |
| 31 | ∞ | 1.2000 | 1.49023 | 57.49 |
| 32 | ∞ | 15.0000 | | |
| 33 (EP) | ∞ | | | |

TABLE 8

| Example 3 | | | | |
|---|---|---|---|---|
| | Wide Angle End Infinity | Telephoto End Infinity | Wide Angle End 3 m | Telephoto End 3 m |
| Magnification | −0.96 | −3.44 | −0.98 | −3.62 |
| 2ω (°) | 35.4 | 9.0 | 34.4 | 8.4 |
| Diopter | −1.0 dpt | −1.0 dpt | −1.0 dpt | −1.0 dpt |
| DD[2] | 2.8611 | 2.8611 | 4.3349 | 4.3349 |
| DD[4] | 4.1919 | 18.7938 | 2.7181 | 17.3200 |
| DD[8] | 24.2008 | 0.5001 | 24.2008 | 0.5001 |
| DD[14] | 0.3000 | 9.3989 | 0.3000 | 9.3989 |

TABLE 9

| Example 3 | | | |
|---|---|---|---|
| Sn | 11 | 12 | 27 |
| KA | −1.3750819E−01 | 1.4764099E+00 | 7.2977549E−01 |
| A3 | 0.0000000E+00 | 0.0000000E+00 | 0.0000000E+00 |
| A4 | −1.1966490E−04 | −9.2449532E−05 | 9.2191900E−04 |
| A5 | 1.1522817E−05 | 3.4527922E−05 | 6.7801780E−05 |
| A6 | 4.0487057E−05 | 4.1144913E−05 | −1.3474732E−04 |
| A7 | −2.2008325E−05 | −2.8787557E−05 | 3.1312767E−05 |
| A8 | 4.5243980E−06 | 7.5071728E−06 | −8.8464326E−06 |
| A9 | −2.7147955E−07 | −8.6645555E−07 | 2.8224679E−06 |
| A10 | −3.0285671E−08 | 2.8181783E−08 | −2.6349635E−07 |
| A11 | 7.3717524E−10 | −9.9461258E−10 | −4.3628287E−08 |
| A12 | 1.2266579E−09 | 1.0278199E−09 | 3.3754030E−09 |
| A13 | −1.6542423E−10 | −1.3949123E−10 | 2.0700699E−09 |
| A14 | 5.1808115E−12 | 3.4350954E−12 | −3.8175866E−10 |
| A15 | 3.3106373E−13 | 4.1533576E−13 | 2.3221269E−11 |
| A16 | −1.9446603E−14 | −2.1417992E−14 | −4.1392877E−13 |
| Sn | 28 | 29 | 30 |
| KA | −1.3359747E+00 | 5.0000080E+00 | −1.1010503E−01 |
| A3 | 0.0000000E+00 | 0.0000000E+00 | 0.0000000E+00 |
| A4 | 1.2436554E−03 | 7.2620798E−05 | −1.6271463E−04 |
| A5 | −3.8241648E−05 | 2.4868134E−05 | −6.0349742E−05 |
| A6 | −7.1867379E−05 | −4.0494433E−05 | 3.4980430E−05 |
| A7 | −5.1215971E−05 | −1.5015453E−05 | 5.8440014E−07 |
| A8 | 2.6044928E−05 | 6.3594937E−06 | −3.0330172E−06 |
| A9 | −3.8615009E−06 | 2.0967447E−07 | 6.1898402E−07 |
| A10 | 3.0750737E−07 | −2.1496939E−07 | −2.5263196E−08 |
| A11 | −5.5315304E−08 | 4.0697437E−09 | −3.6423188E−09 |
| A12 | 7.4837805E−09 | 2.3537052E−09 | −3.9744959E−10 |
| A13 | 8.0836335E−12 | 1.1782332E−10 | 1.6977620E−10 |
| A14 | −3.8307918E−11 | −2.8299738E−11 | −9.1755022E−12 |
| A15 | −2.8678673E−12 | −1.8302320E−12 | −6.1248088E−13 |
| A16 | 3.5272098E−13 | 2.2729008E−13 | 5.1178771E−14 |

Example 4

Figure 21:
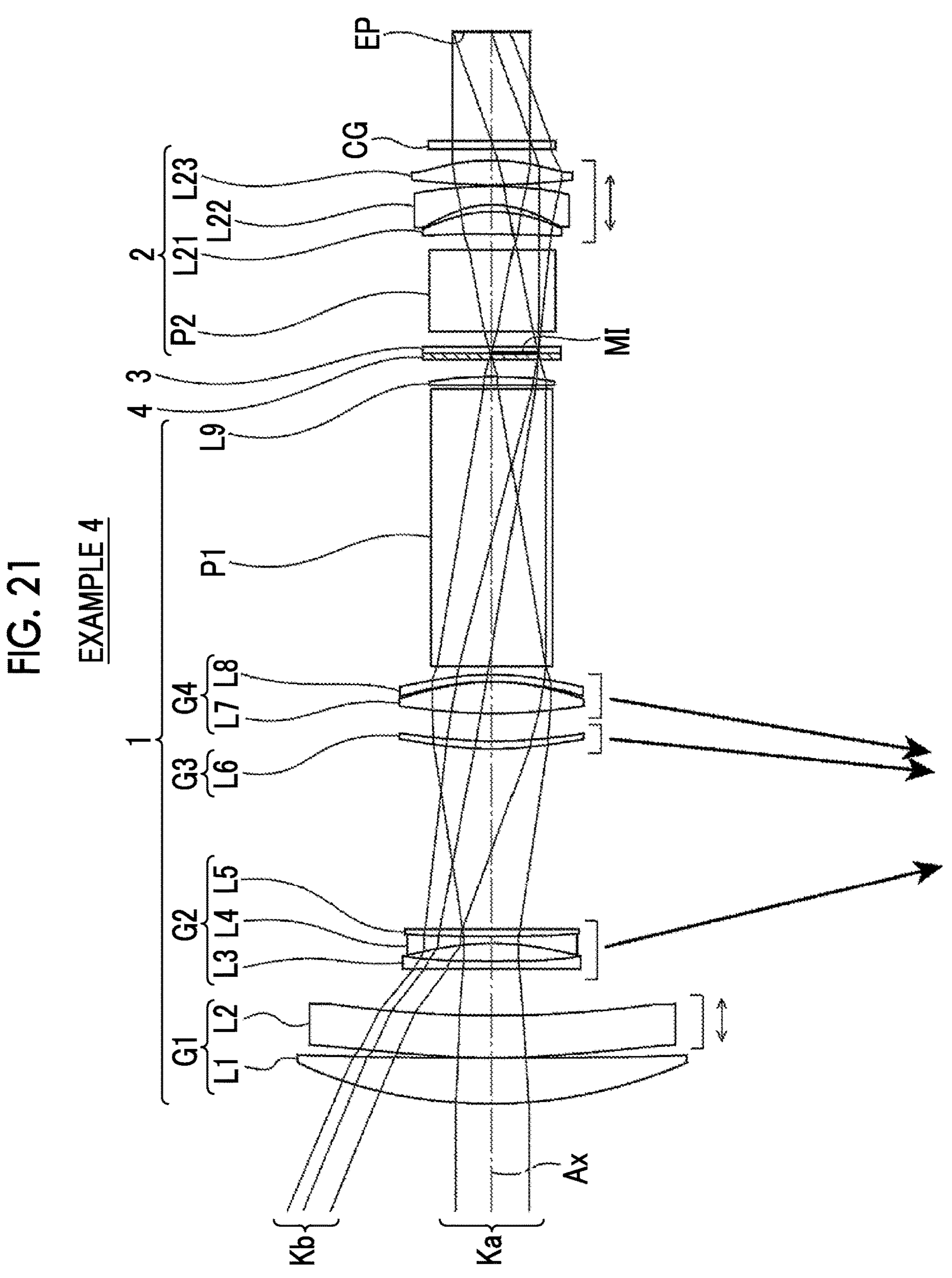
FIG. 21 is a cross-sectional view showing a configuration and luminous flux of a finder of Example 4.

The configuration and luminous flux of a finder of Example 4 are shown in FIG. 21. The finder of Example 4 comprises, in order from the object side to the eye point EP side along the optical path, the objective optical system 1, the light shielding member 4, the display element 3, the ocular optical system 2, and the optical member CG The objective optical system 1 consists of, in order from the object side to the eye point EP side, a first lens group G1, a second lens group G2, a third lens group G3, a fourth lens group G4, a first prism P1, and a lens L9. The first lens group G1 consists of two lenses of lenses L1 and L2. The second lens group G2 consists of three lenses of lenses L3 to L5. The third lens group G3 consists of one lens of a lens L6. The fourth lens group G4 consists of two lenses of lenses L7 and L8. During zooming from the wide angle end to the telephoto end, the second lens group G2 is moved to the eye point EP side along the optical axis Ax, the third lens group G3 and the fourth lens group G4 are moved to the object side along the optical axis Ax while changing the spacing therebetween, and the first lens group G1 is fixed. The diopter adjustment group of the objective optical system 1 consists of one lens of the lens L2.

The ocular optical system 2 consists of, in order from the object side to the eye point EP side along the optical path, a second prism P2 and three lenses of lenses L21 to L23. The diopter adjustment group of the ocular optical system 2 consists of three lenses of the lenses L21 to L23. Each of the first prism P1 and the second prism P2 includes a reflecting surface for forming an erect image.

Figure 22:
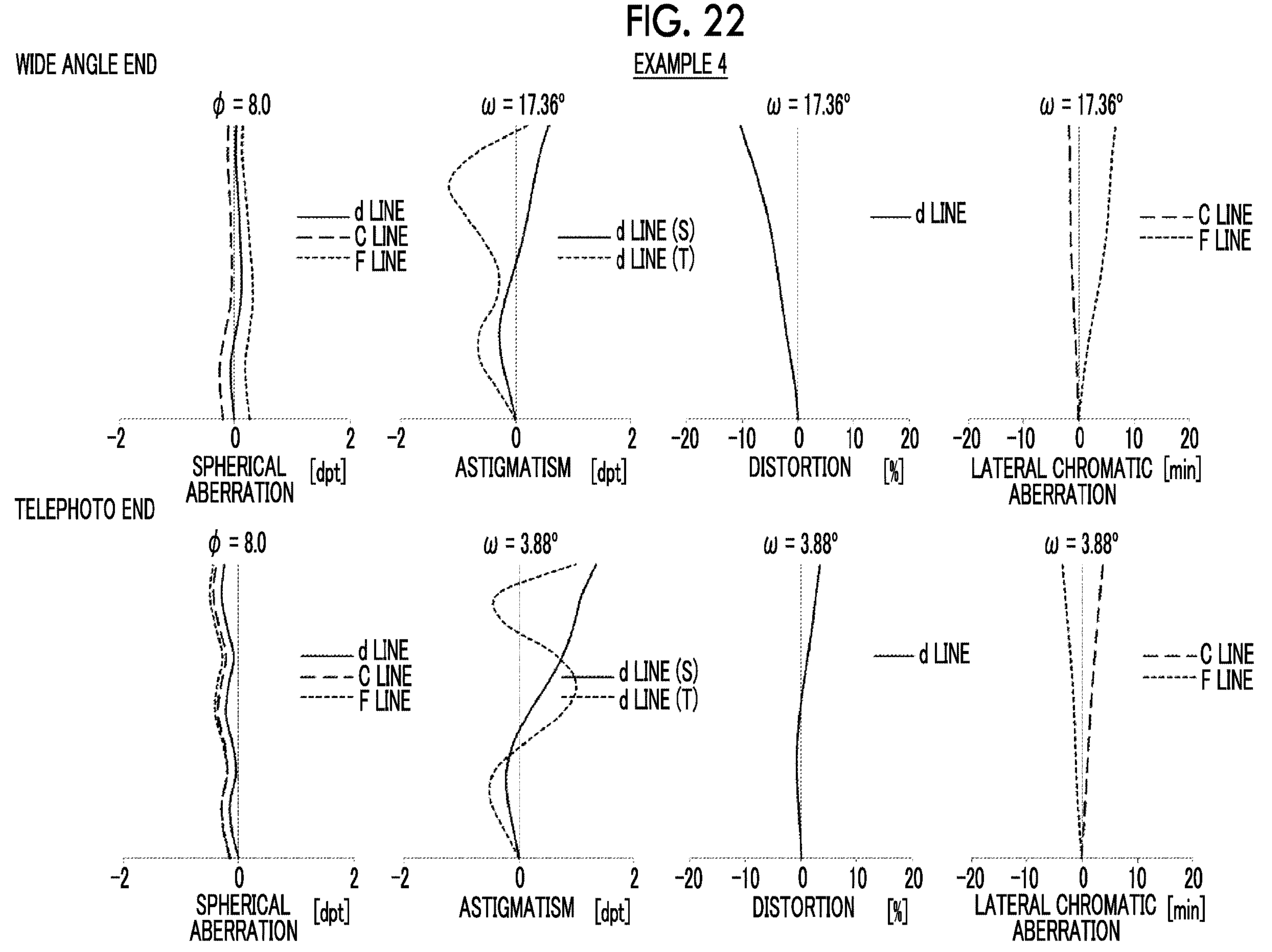
FIG. 22 shows respective aberration diagrams of the finder of Example 4.

In regard to the finder of Example 4, basic lens data is shown in Table 10, specifications and variable surface spacings are shown in Table 11, aspherical coefficients are shown in Table 12, and aberration diagrams in a state in which the diopter is −1.00 are shown in FIG. 22.

TABLE 10

| Example 4 | | | | |
|---|---|---|---|---|
| Sn | R | D | Nd | νd |
| 1 | 39.0142 | 5.8837 | 1.74569 | 53.43 |
| 2 | 456.7808 | DD[2] | | |
| 3 | 100.5971 | 5.5385 | 1.97311 | 16.34 |
| 4 | 71.6345 | DD[4] | | |
| 5 | −355.7554 | 0.7990 | 1.65306 | 38.97 |
| 6 | 43.4010 | 2.5448 | | |
| 7 | −22.5398 | 0.7985 | 1.84035 | 43.97 |
| 8 | 73.3508 | 0.2682 | | |
| 9 | 146.1574 | 0.8946 | 2.00001 | 15.00 |
| 10 | 19865.0252 | DD[10] | | |
| 11 | 30.6454 | 1.0335 | 1.74981 | 53.02 |
| 12 | 41.9001 | DD[12] | | |
| *13 | 32.3934 | 4.2981 | 1.69680 | 55.46 |
| *14 | −19.4677 | 0.1000 | | |
| 15 | −21.4354 | 0.7989 | 1.94776 | 17.61 |
| 16 | −30.1246 | DD[16] | | |
| 17 | ∞ | 38.1902 | 1.51680 | 64.20 |
| 18 | ∞ | 0.3502 | | |
| 19 | ∞ | 1.3034 | 1.93440 | 34.56 |
| 20 | −25.7254 | 2.1012 | | |
| 21 | ∞ | 1.0000 | 1.51680 | 64.20 |
| 22 | ∞ | 0.0000 | | |
| (MI) | | | | |
| 23 | ∞ | 1.0000 | 1.51680 | 64.20 |
| 24 | ∞ | 2.0975 | | |
| 25 | ∞ | 11.1858 | 1.51680 | 64.20 |
| 26 | ∞ | 2.1149 | | |
| 27 | −79.5271 | 3.0514 | 1.82536 | 42.47 |
| 28 | −12.9049 | 0.8885 | | |
| *29 | −9.1838 | 2.7126 | 1.63351 | 23.63 |
| *30 | −27.9598 | 0.1000 | | |
| *31 | 43.3377 | 3.6504 | 1.53389 | 55.98 |
| *32 | −15.4208 | 1.4135 | | |
| 33 | ∞ | 1.2000 | 1.49023 | 57.49 |
| 34 | ∞ | 15.0000 | | |
| 35 | ∞ | | | |
| (EP) | | | | |

TABLE 11

| Example 4 | | | | |
|---|---|---|---|---|
| | Wide Angle End Infinity | Telephoto End Infinity | Wide Angle End 3 m | Telephoto End 3 m |
| Magnification | −0.99 | −3.96 | −1.01 | −4.19 |
| 2ω (°) | 34.8 | 7.8 | 33.8 | 7.2 |
| Diopter | −1.0 dpt | −1.0 dpt | −1.0 dpt | −1.0 dpt |
| DD[2] | 0.3941 | 0.3941 | 4.5163 | 4.5163 |
| DD[4] | 6.5732 | 22.0321 | 2.4510 | 17.9099 |
| DD[10] | 24.8324 | 0.6788 | 24.8324 | 0.6788 |
| DD[12] | 3.9123 | 0.2999 | 3.9123 | 0.2999 |
| DD[16] | 1.1735 | 13.4807 | 1.1735 | 13.4807 |

TABLE 12

| Example 4 | | | |
|---|---|---|---|
| Sn | 13 | 14 | 29 |
| KA | 7.1947658E−01 | 1.3753906E+00 | 8.8631641E−01 |
| A3 | 0.0000000E+00 | 0.0000000E+00 | 0.0000000E+00 |
| A4 | −1.6432785E−05 | 2.6020820E−05 | −1.3222601E−03 |
| A5 | 3.4432279E−06 | 3.7441653E−05 | 1.7319788E−03 |
| A6 | 4.8142839E−05 | 1.8184066E−06 | −1.8064008E−03 |

TABLE 12-continued

| Example 4 | | | |
|---|---|---|---|
| A7 | −3.6626369E−05 | −1.0870981E−05 | 1.2148131E−03 |
| A8 | 1.0714584E−05 | 2.7007105E−06 | −4.7157034E−04 |
| A9 | −1.3803920E−06 | 2.0593039E−07 | 1.0416863E−04 |
| A10 | 6.1283724E−08 | −1.5556532E−07 | −1.1107238E−05 |
| A11 | −4.6476228E−09 | 1.7195493E−08 | −4.1031844E−08 |
| A12 | 1.9155736E−09 | 2.2316107E−10 | 8.7884132E−08 |
| A13 | −1.7539507E−10 | −7.2786123E−11 | 1.2870154E−08 |
| A14 | −8.3939190E−12 | −1.3343526E−11 | −4.6490455E−09 |
| A15 | 1.8343179E−12 | 2.0200892E−12 | 4.4146801E−10 |
| A16 | −6.7814765E−14 | −7.1806585E−14 | −1.4633055E−11 |
| Sn | 30 | 31 | 32 |
| KA | −5.1614025E−02 | 4.7393997E+00 | −2.1522331E+00 |
| A3 | 0.0000000E+00 | 0.0000000E+00 | 0.0000000E+00 |
| A4 | 2.9136628E−04 | 5.7526354E−04 | −2.6993322E−04 |
| A5 | 2.3562982E−04 | 2.6475283E−04 | 2.0271177E−04 |
| A6 | −5.9780975E−05 | −8.1094959E−05 | −2.1167451E−04 |
| A7 | −1.2196877E−05 | −5.1231278E−05 | 1.3400972E−04 |
| A8 | 1.7214887E−06 | 1.7953629E−05 | −5.0185771E−05 |
| A9 | 1.2058230E−06 | −1.0865043E−06 | 1.0675375E−05 |
| A10 | −2.0808640E−07 | −1.0947368E−07 | −1.1314988E−06 |
| A11 | −2.1917293E−08 | −1.3888435E−09 | 2.0655228E−08 |
| A12 | 6.1997526E−09 | −5.9826050E−10 | 5.5798180E−09 |
| A13 | −2.2821321E−10 | 8.2014857E−10 | 1.5422547E−10 |
| A14 | 9.0182078E−12 | −8.6681405E−11 | −1.2878084E−10 |
| A15 | −5.6398367E−12 | 2.1775971E−13 | 1.1777731E−11 |
| A16 | 3.9726772E−13 | 1.9882332E−13 | −3.5768567E−13 |

Table 13 shows the corresponding values of Conditional Expressions (1) to (12) of the finder of each of Examples 1 to 4.

TABLE 13

| Expression Number | | Example 1 | Example 2 | Example 3 | Example 4 |
|---|---|---|---|---|---|
| (1) | fo/fe | 2.990 | 2.983 | 3.440 | 3.955 |
| (2) | do/de | 3.197 | 3.444 | 3.379 | 3.835 |
| (3) | dPo/dPe | 2.996 | 3.550 | 2.962 | 3.414 |
| (4) | di/fe | 0.154 | 0.161 | 0.170 | 0.170 |
| (5) | \|d\|/fe | 0 | 0 | 0 | 0 |
| (6) | νdno | 74.500 | 75.880 | 65.300 | 43.970 |
| (7) | f1/fo | 0.897 | 1.027 | 1.027 | 0.926 |
| (8) | Ndpo | 1.89014 | 1.85378 | 1.74665 | 2.00001 |
| (9) | νdne | 23.63 | 23.63 | 23.63 | 23.63 |
| (10) | fne/de | −0.6555 | −1.7656 | −0.6755 | −0.8533 |
| (11) | fe × Nda/Ra | −1.3066 | −1.3904 | −1.4688 | −1.3724 |
| (12) | dwtn/do | 0.1497 | 0.1788 | 0.1568 | 0.1504 |

An absolute value of the finder magnification in a state in which the diopter of the finder of each of Examples 1 to 4 is −1 is two times or more, and a high magnification is achieved. In the finder of each of Examples 1 to 4, aberrations are favorably corrected, and high optical performance is realized.

Hereinafter, although the technique of the present disclosure has been described above through the embodiment and the examples, the technique of the present disclosure is not limited to the above-described embodiment and examples, and various modifications may be made. For example, the radius of curvature, the surface spacing, the refractive index, the Abbe's number, and the aspherical surface coefficient of each lens are not limited to the values shown in the numerical examples, and different values may be used. The number of lenses included in the objective optical system and the ocular optical system may be the number of lenses different from the above-described examples. The number of lens groups included in the objective optical system may be the number of lens groups different from the above-described examples. The lens group that is included in the objective optical system 1 and is moved during zooming may be a lens group different from the above-described examples. The diopter adjustment group included in the objective optical system and the ocular optical system may be a group different from the above-described examples. The image erecting optical system may have a configuration different from the above-described embodiment and the modification examples.

The preferable configurations in the present specification and available configurations including the configurations regarding the conditional expressions may be any combination within a consistent scope, and it is preferable to optionally employ the configurations according to required specification. The conditional expressions that the finder of the technique of the present disclosure preferably satisfies are not limited to the conditional expressions described in the form of expressions, and include all conditional expressions obtained by optionally combining the lower limits and the upper limits from preferable, more preferable, and still more preferable conditional expressions.

In the above-described embodiment, although the external type finder has been described as an example, the technique of the present disclosure is not limited thereto. The finder may be incorporated in the camera body. In this case, the body processor of the camera body controls the display element and the light shielding member.

The finder according to the technique of the present disclosure can be applied to apparatuses other than the apparatus of the above-described embodiment, and can also be applied to, for example, a film camera, a video camera, and a head mounted display.

The content of the above description and the content of the drawings are detailed description of portions according to the technique of the present disclosure, and are merely examples of the technique of the present disclosure. For example, the above description relating to configurations, functions, operations, and advantageous effects is description relating to configurations, functions, operations, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" also applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A finder comprising, in order from an object side to an eye point side along an optical path:

an objective optical system that includes at least one lens and forms an intermediate image; and an ocular optical system that includes at least one lens and is provided for observation of the intermediate image, wherein the intermediate image is positioned on the optical path between the objective optical system and the ocular optical system, the finder includes a plurality of reflecting surfaces for forming an erect image, each of the objective optical system and the ocular optical system has at least one of the plurality of reflecting surfaces, and assuming that a focal length of the objective optical system in a state in which an infinite distance object is observed is fo, in a case where the objective optical system is a variable magnification optical system, fo is a value at a telephoto end, and a focal length of the ocular optical system in a state in which diopter is −1 is fe, Conditional Expression (1) is satisfied, which is represented by $$2<fo/fe<8 \quad (1), \text{ and}$$

wherein the objective optical system has a first prism including the reflecting surface, the ocular optical system has a second prism including the reflecting surface, and assuming that a distance from a most object-side surface of the first prism to a most eye point-side surface of the first prism on an optical axis is dPo, and a distance from a most object-side surface of the second prism to a most eye point-side surface of the second prism on the optical axis is dPe, Conditional Expression (3-3) is satisfied, which is represented by $$2.8<dPo/dPe<5 \quad (3\text{-}3).$$

2. The finder according to claim 1, wherein, assuming that a distance from a most object-side lens surface of the objective optical system to the intermediate image on an optical axis in a state in which the infinite distance object is observed is do, in a case where the objective optical system is the variable magnification optical system, do is a value at the telephoto end, and a distance from the intermediate image to a most eye point-side lens surface of the ocular optical system on the optical axis in a state in which the infinite distance object is observed and the diopter is −1 is de, Conditional Expression (2) is satisfied, which is represented by $$1.8<do/de<6 \quad (2).$$

3. The finder according to claim 1, wherein diopter adjustment is performed by moving at least one lens of the ocular optical system along an optical axis.

4. The finder according to claim 3, wherein the diopter adjustment is performed by moving at least one lens of the objective optical system along the optical axis.

5. The finder according to claim 1, wherein an optical surface having refractive power closest to the intermediate image on the object side of the intermediate image has positive refractive power.

6. The finder according to claim 5, wherein, assuming that a distance from the optical surface to the intermediate image on an optical axis is di, Conditional Expression (4) is satisfied, which is represented by $$0.025<di/fe<0.4 \quad (4).$$

7. The finder according to claim 4 provided in an imaging apparatus, further comprising:

a display element that is disposed at a position of the intermediate image and displays an image; and a condensing position variable mechanism that changes a condensing position of light from the objective optical system by moving at least one lens to be moved during the diopter adjustment of the objective optical system and moves the condensing position to a position different from the display element in an unused state of the imaging apparatus.

8. The finder according to claim 1, wherein the ocular optical system includes one or more positive lenses and one or more negative lenses.

9. The finder according to claim 5, wherein, assuming that a refractive index of a medium on the object side of the optical surface with respect to a d line is Nda, and a radius of curvature of the optical surface is Ra, Conditional Expression (11) is satisfied, which is represented by $$-2.5<fe\times Nda/Ra<-0.4 \quad (11).$$

10. An imaging apparatus comprising:

the finder according to claim 1.

11. A finder comprising, in order from an object side to an eye point side along an optical path:

an objective optical system that includes at least one lens and forms an intermediate image; and an ocular optical system that includes at least one lens and is provided for observation of the intermediate image, wherein the intermediate image is positioned on the optical path between the objective optical system and the ocular optical system, the finder includes a plurality of reflecting surfaces for forming an erect image, each of the objective optical system and the ocular optical system has at least one of the plurality of reflecting surfaces, and assuming that a focal length of the objective optical system in a state in which an infinite distance object is observed is fo, in a case where the objective optical system is a variable magnification optical system, fo is a value at a telephoto end, and a focal length of the ocular optical system in a state in which diopter is −1 is fe, Conditional Expression (1) is satisfied, which is represented by $$2<fo/fe<8 \quad (1),$$

wherein the finder further comprises a display element that displays an image, at a position of the intermediate image or an optically conjugate position with the intermediate image, and wherein, assuming that, in a case where the display element is disposed at the position of the intermediate image, an air conversion distance between an image display surface of the display element and the intermediate image in an optical axis direction is d, and in a case where the display element is disposed at the conjugate position, an air conversion distance between the image display surface of the display element and the conjugate position in the optical axis direction is d, Conditional Expression (5) is satisfied, which is represented by $$0\leq|d|/fe<0.08 \quad (5).$$

12. The finder according to claim 11, further comprising:

a light shielding member that shields at least a part of luminous flux emitted from the objective optical system, on the optical path between the objective optical system and the ocular optical system.

13. The finder according to claim 12, wherein a region that is shielded by the light shielding member is variable.

14. A finder comprising, in order from an object side to an eye point side along an optical path:

an objective optical system that includes at least one lens and forms an intermediate image; and an ocular optical system that includes at least one lens and is provided for observation of the intermediate image, wherein the intermediate image is positioned on the optical path between the objective optical system and the ocular optical system, the finder includes a plurality of reflecting surfaces for forming an erect image, each of the objective optical system and the ocular optical system has at least one of the plurality of reflecting surfaces, and assuming that a focal length of the objective optical system in a state in which an infinite distance object is observed is fo, in a case where the objective optical system is a variable magnification optical system, fo is a value at a telephoto end, and a focal length of the ocular optical system in a state in which diopter is −1 is fe, Conditional Expression (1) is satisfied, which is represented by $$2<fo/fe<8 \quad (1),$$

wherein the objective optical system includes a plurality of lens groups in which an interval between adjacent groups changes during zooming, and wherein the objective optical system includes a negative lens group having negative refractive power that is moved to the eye point side during zooming from a wide angle end to the telephoto end, and a positive lens group having positive refractive power that is moved to the object side during zooming from the wide angle end to the telephoto end.

15. The finder according to claim 14, wherein the negative lens group includes two or more negative lenses.

16. The finder according to claim 15, wherein, assuming that an Abbe's number of the negative lens of the negative lens group based on a d line is vdno, the negative lens group includes at least one negative lens satisfying Conditional Expression (6) represented by $$40<vdno<110 \quad (6).$$

17. The finder according to claim 16, wherein a most object-side lens group of the objective optical system has positive refractive power.

18. The finder according to claim 17, wherein, assuming that a focal length of the most object-side lens group of the objective optical system is f1, Conditional Expression (7) is satisfied, which is represented by $$0.45<f1/fo<3 \quad (7).$$

19. The finder according to claim 18, wherein, assuming that a refractive index of a positive lens of a lens group having positive refractive power of the objective optical system with respect to the d line is Ndpo, the lens group having the positive refractive power of the objective optical system includes at least one positive lens satisfying Conditional Expression (8) represented by $$1.65<Ndpo<2.3 \quad (8).$$

20. The finder according to claim 8, wherein, assuming an Abbe's number of the negative lens of the ocular optical system based on a d line is vdne, the ocular optical system includes at least one negative lens satisfying Conditional Expression (9) represented by $$10<vdne<40 \quad (9).$$

21. The finder according to claim 20, wherein, assuming that a focal length of the negative lens satisfying Conditional Expression (9) of the ocular optical system is fne, and a distance from the intermediate image to a most eye point-side lens surface of the ocular optical system on an optical axis in a state in which the infinite distance object is observed and the diopter is −1 is de, the ocular optical system includes at least one negative lens satisfying Conditional Expression (10) represented by $$-3<fne/de<-0.2 \quad (10).$$

22. The finder according to claim 14, wherein, assuming that a difference between a position at the wide angle end and a position at the telephoto end of the negative lens group is dwtn, and a distance from a most object-side lens surface of the objective optical system at the telephoto end to the intermediate image on an optical axis in a state in which the infinite distance object is observed is do, Conditional Expression (12) is satisfied, which is represented by $$0.05<dwtn/do<0.5 \quad (12).$$

* * * * *